US012660761B2

(12) United States Patent
Kajiyama et al.

(10) Patent No.: US 12,660,761 B2
(45) Date of Patent: Jun. 23, 2026

(54) PLANT CULTIVATION METHOD, PLANT CULTIVATION APPARATUS, AND PHOTOSYNTHETIC ORGANISM PRODUCTION METHOD

(71) Applicant: Agri Blue Co., Ltd., Takamatsu (JP)

(72) Inventors: Hiroshi Kajiyama, Takamatsu (JP); Miya Kajiyama, Takamatsu (JP); Rin Kajiyama, Takamatsu (JP)

(73) Assignee: Agri Blue Co., Ltd., Takamatsu (JP)

( * ) Notice: Subject to any disclaimer, the term of this patent is extended or adjusted under 35 U.S.C. 154(b) by 111 days.

(21) Appl. No.: 18/432,287

(22) Filed: Feb. 5, 2024

(65) Prior Publication Data

US 2024/0172599 A1 May 30, 2024

Related U.S. Application Data

(63) Continuation of application No. PCT/JP2022/039000, filed on Oct. 19, 2022.

(30) Foreign Application Priority Data

Dec. 6, 2021 (JP) ................................. 2021-198092

(51) Int. Cl.
*A01G 7/04* (2006.01)
*A01G 9/14* (2006.01)
(52) U.S. Cl.
CPC ............... *A01G 7/045* (2013.01); *A01G 9/14* (2013.01)
(58) Field of Classification Search
CPC .................................. A01G 7/045; A01G 7/04
See application file for complete search history.

(56) References Cited

U.S. PATENT DOCUMENTS

| | | | |
|---|---|---|---|
| 2012/0170264 A1* | 7/2012 | McKenzie | ............. A01G 9/249 |
| | | | 362/231 |
| 2014/0165462 A1 | 6/2014 | Shigyo | |
| 2014/0170733 A1 | 6/2014 | Shigyo | |
| 2014/0215913 A1* | 8/2014 | Takeuchi | ............... A01G 7/045 |
| | | | 47/58.1 LS |
| 2016/0184237 A1* | 6/2016 | Lowe | ..................... A01G 22/00 |
| | | | 47/58.1 LS |

(Continued)

FOREIGN PATENT DOCUMENTS

| | | | |
|---|---|---|---|
| CA | 3071310 A1 | 2/2019 | |
| EP | 4570060 A1 * | 6/2025 | ............. A01G 22/00 |

(Continued)

OTHER PUBLICATIONS

Yoshimura translation, 2011, JP2011212011, retrieved from EPO Aug. 19, 2025 (Year: 2011).*

(Continued)

*Primary Examiner* — Kristen C Hayes
(74) *Attorney, Agent, or Firm* — Muncy, Geissler, Olds & Lowe, P.C.

(57) ABSTRACT

Irradiation with main light for photosynthesis and irradiation with additional light with which irradiation can be performed in addition to the main light are performed in at least a part of a cultivation period from sowing to harvesting, and the additional light includes at least additional signal light among the additional signal light of which a light intensity periodically fluctuates and additional moderate light of which a light intensity gently changes as compared with the additional signal light.

18 Claims, 11 Drawing Sheets

(56) References Cited

U.S. PATENT DOCUMENTS

| | | | |
|---|---|---|---|
| 2017/0027135 A1 | 2/2017 | Suntych | |
| 2017/0142940 A1 | 5/2017 | Suntych | |
| 2017/0347532 A1 | 12/2017 | Suntych | |
| 2018/0184623 A1 | 7/2018 | Suntych | |
| 2019/0141961 A1 | 5/2019 | Suntych | |
| 2020/0170197 A1 | 6/2020 | Kajiyama | |
| 2020/0253129 A1 | 8/2020 | Nicole | |
| 2020/0260654 A1 | 8/2020 | Suntych | |
| 2020/0281167 A1 | 9/2020 | Suntych | |
| 2022/0211011 A1 | 7/2022 | Suntych | |
| 2024/0215495 A1* | 7/2024 | Oh | A01G 7/045 |
| 2024/0315176 A1* | 9/2024 | Dong | A01G 7/045 |
| 2025/0120385 A1* | 4/2025 | Roy-Moisan | A01G 22/05 |
| 2025/0204334 A1* | 6/2025 | Newman | H05B 47/155 |
| 2025/0228283 A1* | 7/2025 | Yang | A01G 31/06 |

FOREIGN PATENT DOCUMENTS

| | | | | |
|---|---|---|---|---|
| JP | 2011-212011 | 10/2011 | | |
| JP | 2011212011 A * | 10/2011 | | A01G 7/045 |
| JP | 2015-142585 | 8/2015 | | |
| JP | 2017-528130 | 9/2017 | | |
| JP | 2020-54287 | 4/2020 | | |
| WO | 2011/115123 | 9/2011 | | |
| WO | 2019/031559 | 7/2020 | | |
| WO | WO-2024102071 A2 * | 5/2024 | | A01G 7/045 |
| WO | WO-2024125899 A1 * | 6/2024 | | A01G 7/045 |

OTHER PUBLICATIONS

The extended European search report for the corresponding EP application No. 22903873.2 mailed Feb. 5, 2026.

* cited by examiner

FIG. 1

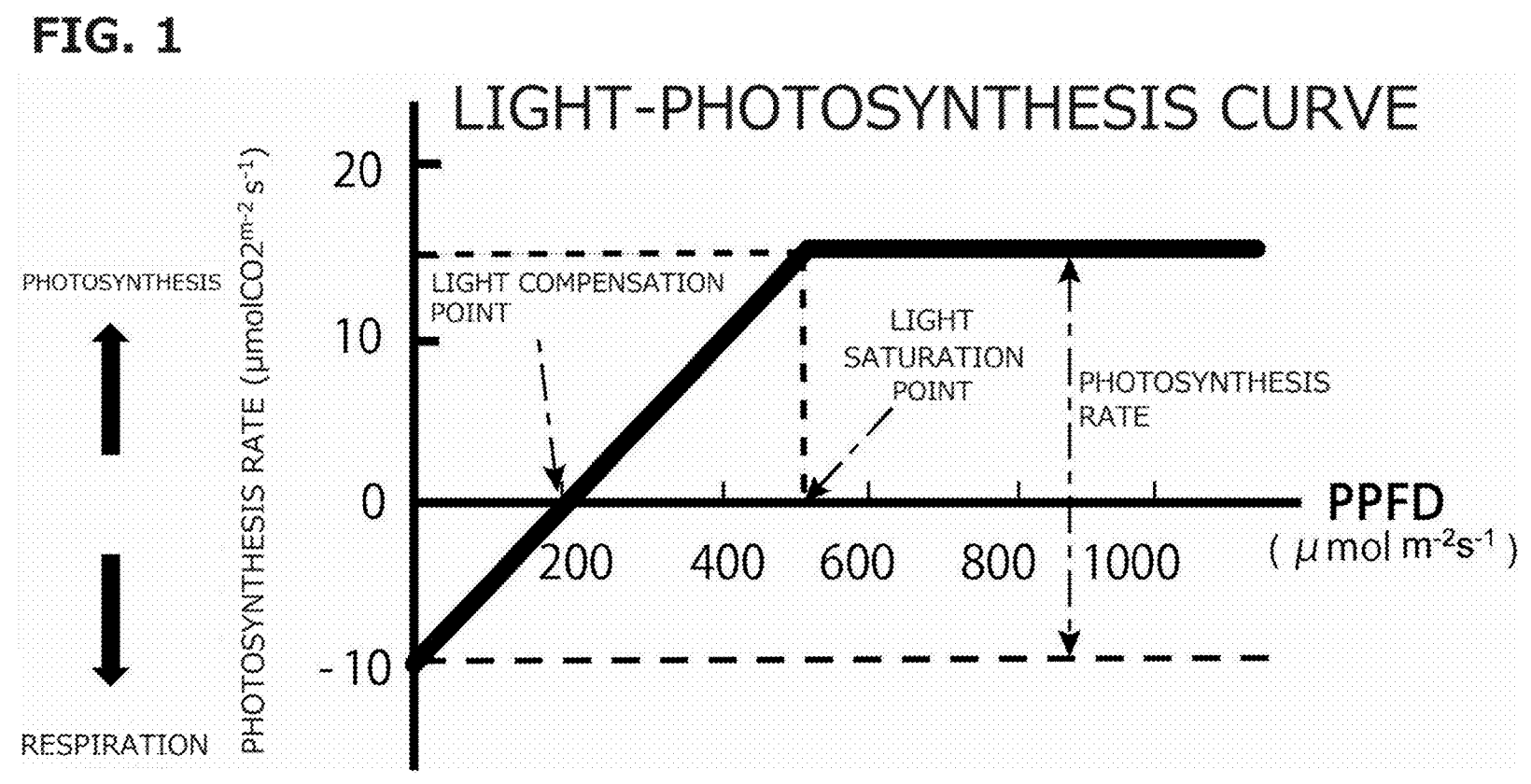

LIGHT-PHOTOSYNTHESIS CURVE

PPFD
$(\mu mol\ m^{-2}s^{-1})$

PHOTOSYNTHESIS RATE

LIGHT SATURATION POINT

LIGHT COMPENSATION POINT

PHOTOSYNTHESIS RATE $(\mu molCO2\ m^{-2}\ s^{-1})$ 20    10    0    -10

200    400    600    800    1000

PHOTOSYNTHESIS

RESPIRATION

FIG. 2

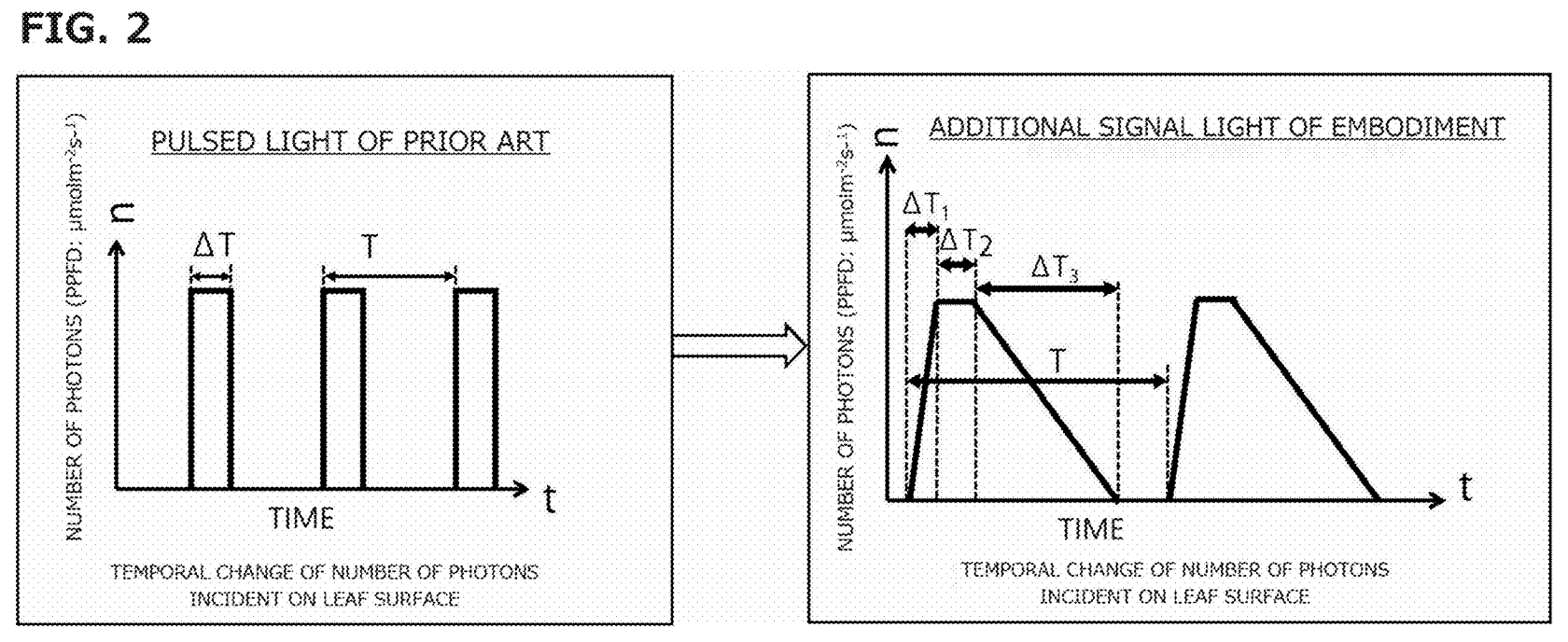

PULSED LIGHT OF PRIOR ART

NUMBER OF PHOTONS (PPFD: μmolm⁻²s⁻¹)

TIME

TEMPORAL CHANGE OF NUMBER OF PHOTONS INCIDENT ON LEAF SURFACE.

ADDITIONAL SIGNAL LIGHT OF EMBODIMENT

NUMBER OF PHOTONS (PPFD: μmolm⁻²s⁻¹)

TIME

TEMPORAL CHANGE OF NUMBER OF PHOTONS INCIDENT ON LEAF SURFACE.

PHOTOSYNTHESIS PROMOTING EFFECT OF
ADDITIONAL LIGHT IRRADIATION (LETTUCE)

LED WHITE LIGHT : PPFD = 20 $\mu mol \cdot m^{-2} \cdot s^{-1}$

S11     PUT INTO CULTURE VESSEL

S12     IRRADIATION WITH ADDITIONAL LIGHT

S13     SHIFT TO HIGH-SPEED GROWTH MODE

S14     CONTINUATION OF CULTURE SOLUTION INFLOW

S15     COLLECTION OF CULTURE SOLUTION

PLANT CULTIVATION METHOD, PLANT CULTIVATION APPARATUS, AND PHOTOSYNTHETIC ORGANISM PRODUCTION METHOD

CROSS REFERENCE TO RELATED APPLICATIONS

This application is a continuation of International Application No.: PCT/JP2022/039000, which was filed on Oct. 19, 2022, is based on and claims priority to Japanese Patent Applications No. 2021-198092 filed on Dec. 6, 2021, and is herein incorporated by reference.

TECHNICAL FIELD

The present invention relates to, for example, a plant cultivation method, a plant cultivation apparatus, and a photosynthetic organism production method for promoting growth of plants and production of useful components.

BACKGROUND ART

The growth of crops greatly varies depending on weather conditions. In farm field cultivation or greenhouse cultivation, when the amount of sunlight decreases, there is an insufficient amount of light energy required for photosynthesis, and the growth rate of plants decreases. On the other hand, in a plant factory using artificial light, high costs are incurred for lighting equipment for performing irradiation with sufficient light energy and running thereof, and improvement in terms of profitability is desired. For this reason, there is a demand for a lighting technique capable of promoting the rate of growth of crops in roadside cultivation, greenhouse cultivation, and a plant factory, with low lighting costs. Patent Literature 1 discloses an invention capable of promoting growth of plants with low costs.

CITATION LIST

Patent Literature

Patent Literature 1: WO 2019/031559 A

SUMMARY OF INVENTION

Technical Problem

In the method described in Patent Literature 1, irradiation is performed with light having a relatively low duty ratio under a light environment in which plants do not perform photosynthesis. In the experiments of inventors, a result has been obtained that plants are damaged by relatively strong stimuli and deteriorate. Furthermore, there is also a problem that a growth rate and a useful substance production cannot be independently controlled.

An object of the present invention is to provide a plant cultivation method, a plant cultivation apparatus, and a photosynthetic organism production method which are capable of increasing a growth rate of a plant and promoting mass production of a useful substance.

Solution to Problem

The present invention provides a plant cultivation method, a plant cultivation apparatus, and a photosynthetic organism production method having the following configurations.

(1) A plant cultivation method including:
performing irradiation with main light for photosynthesis and irradiation with additional light for promoting the photosynthesis of a plant by the main light, in at least a part of a cultivation period from sowing to harvesting, in which
the additional light includes additional signal light of which a light intensity periodically fluctuates and additional moderate light of which a light intensity gently changes as compared with the additional signal light.

(2) A plant cultivation apparatus which performs irradiation with main light for photosynthesis of a plant, the plant cultivation apparatus including:
an additional light source that performs irradiation with additional light in addition to the main light; and
an irradiation light control unit capable of driving and controlling the additional light source, in which
the additional light source includes at least an additional signal light source among the additional signal light source that performs irradiation with additional signal light of which a light intensity periodically fluctuates and an additional moderate light source that performs irradiation with additional moderate light of which a light intensity gently changes as compared with the additional signal light.

(3) A photosynthetic organism production method including:
performing irradiation with main light for photosynthesis and irradiation with additional light for promoting the photosynthesis of a photosynthetic organism by the main light, in at least a part of a cultivation period from sowing to harvesting, in which
the additional light includes at least additional signal light among the additional signal light of which a light intensity periodically fluctuates and additional moderate light of which a light intensity gently changes as compared with the additional signal light.

Advantageous Effects of Invention

According to the present invention, it is possible to provide a plant cultivation method, a plant cultivation apparatus, and a photosynthetic organism production method which are capable of increasing a growth rate of a plant and promoting mass production of a useful substance.

BRIEF DESCRIPTION OF DRAWINGS

FIG. 1 is a graph showing an example of a light-photosynthesis curve.

FIG. 2 is an explanatory view illustrating comparison between pulsed light of the prior art and additional signal light of an embodiment.

DESCRIPTION OF EMBODIMENTS

Figure 3:
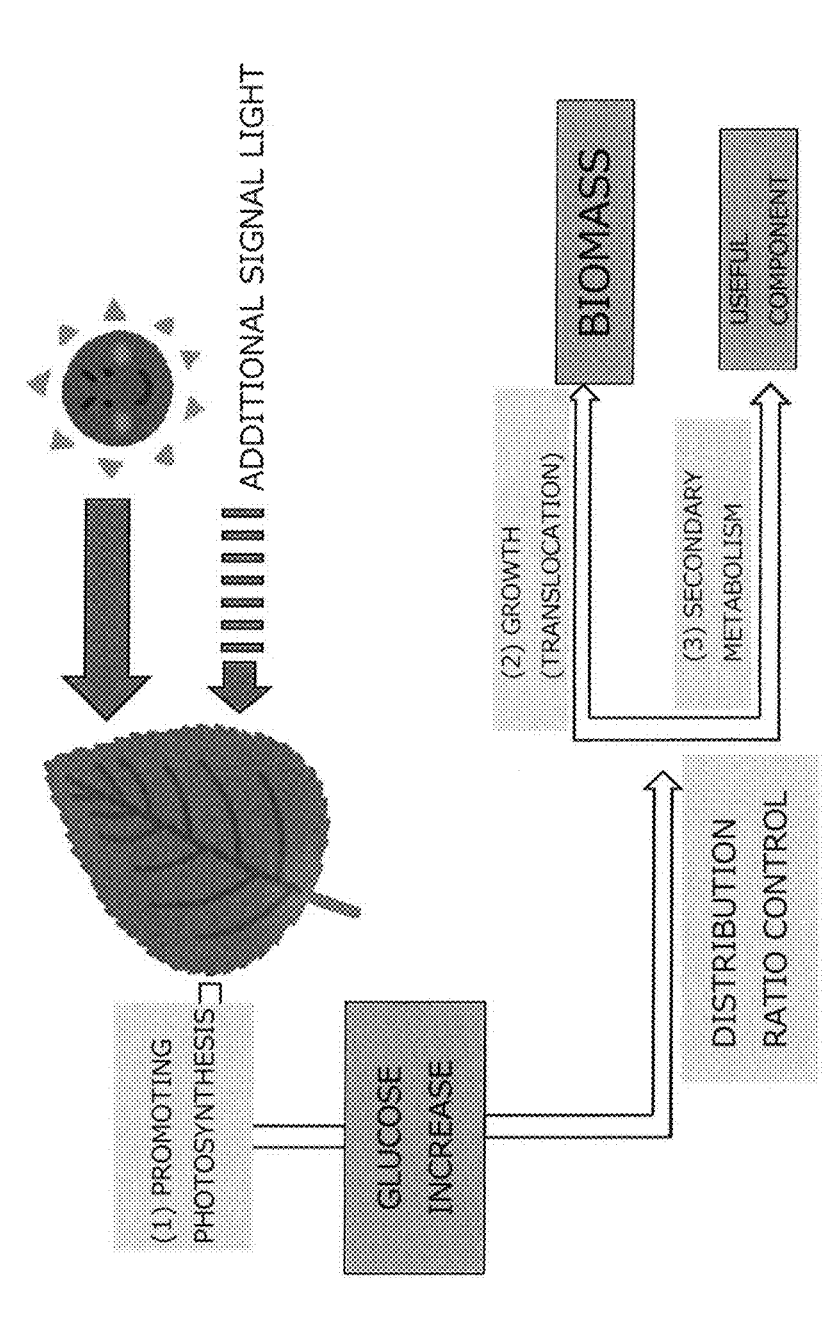
FIG. 3 is an explanatory view illustrating a flow until glucose produced by photosynthesis is distributed to a translocation pathway and a secondary metabolic pathway.

Hereinafter, embodiments of the present invention will be described in detail.

<Plant Cultivation Method>

<<Outline of Plant Cultivation Method in Present Embodiment>>

A plant self-produces carbohydrates necessary for life support and growth by photosynthesis. In photosynthesis, glucose ($C_6H_{12}O_6$) which is a carbohydrate is produced from water ($H_2O$) and carbon dioxide ($CO_2$) which are raw materials. Light energy is essential for a reaction for production proceeding. Light energy is absorbed by a pigment aggregate structure called an optical antenna.

According to the present embodiment, a plant cultivation method in which irradiation is performed by adding light of which a light intensity periodically changes, in an environment where a plant is grown by sunlight (natural light) or artificial light such as an LED is provided. When light to be added stimulates viability of DNA of a plant, photosynthesis can be indirectly promoted. Hereinafter, the light to be added is also referred to as "additional light". The additional light will be described later.

<<Growth of Plant by Main Light>>

A plant performs photosynthesis and respiration at the same time. In photosynthesis, carbon dioxide is absorbed and oxygen is released. In respiration, oxygen is absorbed and carbon dioxide is released. The carbon dioxide absorption rate (unit: $\mu molCO_2 \ m^{-2}s^{-1}$) in photosynthesis depends on a light intensity (see FIG. 1), but a carbon dioxide absorption amount in respiration does not depend on a light intensity.

A difference between the carbon dioxide absorption rate ($\mu molCO_2 \ m^{-2}s^{-1}$) in photosynthesis and a carbon dioxide release rate ($\mu molCO_2 \ m^{-2}s^{-1}$) in respiration is a photosynthesis rate ($UmolCO_2 \ m^{-2}s^{-1}$). A PPFD (photosynthesis effective photon flux density, to be described later) at which the photosynthesis rate becomes zero is a light compensation point (FIG. 1). A value of the light compensation point varies depending on a type of a plant.

A light intensity in photosynthesis is defined by the amount of light radiation with which a leaf surface is irradiated per unit area and per second. This is called photosynthesis effective photon flux density (Photosynthesis Photon Flux Density, hereinafter abbreviated as PPFD).

In a case where water and carbon dioxide are sufficiently supplied, a glucose production amount increases to a constant saturation value in proportion to PPFD. A light intensity when the glucose production amount is saturated is defined as a photosynthesis saturated light intensity. In order to promote growth of plants, light having a light intensity equivalent to the photosynthesis saturated light intensity is required. A "light saturation point" in FIG. 1 corresponds to the photosynthesis saturated light intensity.

When light with which irradiation is performed is equal to or less than a photosynthesis saturation intensity, irradiation with artificial light such as light of an LED may be performed in order to compensate for light shortage. Light that compensates for the light shortage in this manner is referred to as "supplemental light". The supplemental light is used in a method of directly increasing photosynthesis. Artificial light that directly increases photosynthesis can also be referred to as the "supplemental light".

In the present embodiment, sunlight (natural light) or artificial supplemental light is referred to as "main light" for photosynthesis. This main light is light for directly causing or increasing photosynthesis. The main light is sunlight or light emitted from an LED or the like, and is light mainly responsible for photosynthesis. A light intensity of the main light is 1000 times or more than a light intensity of the additional light.

<<Growth Promotion by Additional Light>>

In the present embodiment, auxiliary light different from the main light is artificially created, and a plant is irradiated with the auxiliary light. This auxiliary light is referred to as "additional light". The irradiation of the additional light is performed at a predetermined time or period, which will be described in detail later. The additional light is light for indirectly promoting photosynthesis.

For example, in the plant cultivation method of the present embodiment, irradiation with additional light is performed during a predetermined cultivation period from sowing to harvesting, in a process of irradiation with sunlight or artificial light as main light (main light) for photosynthesis. The additional light is at least one among light of which a light intensity periodically fluctuates (additional signal light) and light of which a light intensity gently changes (additional moderate light or additional wave light). In some cases, irradiation is performed only with the additional signal light as additional light.

The plant cultivation method of the present embodiment is a plant cultivation method in which the irradiation is performed by adding the additional light in a predetermined time period of one day, in which a fluctuation of the light intensity (PPFD) of the additional light is periodic, a fluctuation period is 8 µs or more and 200 µs or less, a wavelength of the periodic fluctuation light is 220 nm or longer and 2000 nm or shorter, and a duty ratio of the periodic fluctuation light is 0.2 or more. These points will be described later.

Hereinafter, a mechanism in which the additional light of which the light intensity (PPFD) periodically changes promotes photosynthesis will be described.

It is known that a plant has a function of integrating light, and a plant integrates according to the intensity of sunlight and irradiation time every day. When decrease in PPFD (PPDF decrease) in the main light is detected by the integration function, DNA in a chloroplast of a plant issues an instruction to increase an amount of chlorophyll in the optical antenna. As a result, a light absorption amount is increased, and photosynthesis is promoted.

In the present embodiment, a differentiating function which is for detecting an intensity change rate of light and is potentially provided in a plant is utilized. Pulsed light (signal light) that repeats turning on and off at regular time intervals can most efficiently stimulate the differentiating function of a plant. Hereinafter, this pulsed light (signal light) is referred to as "additional signal light". The additional signal light is light included in the additional light. In the present embodiment, a plant is irradiated with the additional signal light alone or together with the additional moderate light.

The additional signal light is insufficient to cause photosynthesis compared to the main light. For this reason, a plant is temporarily recognized to be in a starvation state of photosynthesis. When DNA detects a photosynthesis starvation state, DNA issues an instruction to increase an amount of chlorophyll in order to absorb more light required for photosynthesis. Furthermore, by the additional signal light, DNA issues an opening-or-closing control instruction of pores which are inlets or outlets of outside air in order to increase an absorption amount of carbon dioxide. As a result, the light energy required for photosynthesis and the absorption amount of carbon dioxide are increased by the additional pulsed light irradiation. That is, the additional signal light in the present embodiment functions as a trigger signal for causing DNA to issue the chlorophyll increase instruction and the pore opening-or-closing instruction. An effect of the additional signal light in such a way of thinking is defined as a DNA triggering effect of the additional signal light.

The DNA triggering effect increases in proportion to the number of triggers per time, but does not depend on a strength of the trigger signal. When a time interval of the trigger signal is too short, the DNA triggering effect is reduced. In addition, the photosynthesis promoting effect by the additional light including the additional signal light can be obtained no matter what the value of the PPFD of the main light is.

FIG. 2 shows a comparison between the pulsed light in the invention (prior art) disclosed in Patent Literature 1 described above and the additional signal light of the present embodiment. The graph on the left in FIG. 2 shows the prior art, and the graph on the right in FIG. 2 shows the present embodiment. The right and left graphs in FIG. 2 show a temporal change of the number of photons (representing photosynthesis effective photon flux density (PPFD)) incident on a leaf surface.

As illustrated in the graph on the left side of FIG. 2, in the prior art, a shape of a pulse having the number of photons (Photosynthesis effective photon flux density, PPFD) is rectangular, and a steep rise and fall are illustrated. In the graph on the left side of FIG. 2, T represents a period of a pulse, and $\Delta T$ represents a width of a pulse. The period T is a minimum time during which the additional signal light repeats flashing, and a value of T is $2 \text{ }\mu s < T < 500 \text{ }\mu s$.

A value of the number of photons (Photosynthesis effective photon flux density, PPFD) is $0.001 < PPFD < 4.0$, and a unit of the photon number (Photosynthesis effective photon flux density, PPFD) is $\mu mol \cdot m^{-2} \cdot s^{-1}$. A duty ratio ($\Delta T/T$) of a pulse is $\Delta T/T < 0.2$.

On the other hand, in the present embodiment illustrated in the graph on the right side of FIG. 2, a shape of the pulse related to the additional signal light is trapezoidal, and the pulse has a gentle rise and fall as compared with the pulse of the prior art. A period (basic period) of the additional signal light is T, a rise time of one pulse is $\Delta T_1$, a peak time is $\Delta T_2$, and a fall time is $\Delta T_3$. Among these, light intensities of $\Delta T_1$ and $\Delta T_3$ change with time. The gradients of the temporal change in $\Delta T_1$ and $\Delta T_3$ may be the same or different between $\Delta T_1$ and $\Delta T_3$. Furthermore, the gradient at $\Delta T_1$ or $\Delta T_3$ may change in the middle of $\Delta T_1$ or $\Delta T_3$. As a form in which the gradient in $\Delta T_1$ or $\Delta T_3$ is made different in the middle, it is possible to exemplify a form in which a waveform in $\Delta T_1$ or $\Delta T_3$ is curved (bow shaped, arcuate, wavy, or the like), stepped (step-like stair shaped, or the like), or the like.

According to the experiments of the inventors, the photosynthesis promoting effect by the additional light is obtained when the period T of the additional signal light (or signal fluctuation period T of the light intensity of the additional light) is $8 \text{ }\mu s < T < 200 \text{ }\mu s$. In addition, $\Delta T_1$ and $\Delta T_3$ before and after the peak time $\Delta T_2$ are obtained when either one is 5 $\mu s$ or less. The rising period $\Delta T_1$ may be defined as a period from the lowest point to the peak point of the light intensity. The declining period $\Delta T_3$ may be defined as a period from the peak point to the lowest point of the light intensity. The peak period $\Delta T_2$ may be defined as a period during which the peak point maintains. Considering a ratio of $\Delta T_1/T$, the invention is preferably realized within 1/40 to 25/40. Also, considering a ratio of $\Delta T_3/T$, the invention is preferably realized within 1/40 to 25/40. The "T" is measured from a lowest point from which one light intensity fluctuation starts to rise to another lowest point from which the next light intensity fluctuation starts to rise. When the light is pulse like the additional signal light shown in FIG. 4, the light intensity is zero at the lowest point. When the light fluctuates in a smooth wave shape like the additional moderate light shown in FIG. 4, the light intensity is not zero.

Since the intensity of the pulsed light (left side of FIG. 2, rectangular wave light) as in the prior art changes in a relatively short time, the pulsed light acts on a plant as stress (photostress) caused by light irradiation. On the other hand, the light such as the additional signal light (right side of FIG. 2, trapezoidal wave) of the present embodiment is light of which the light intensity periodically fluctuates similarly to the pulsed light of the prior art. However, since the period $\Delta T_1$ during which the light intensity rises while being inclined and the period $\Delta T_3$ during which the light intensity falls while being inclined are added on the waveform, the change in the light intensity is gentle as compared with the prior art. Therefore, the photostress that a plant feels can be alleviated.

Figure 4:
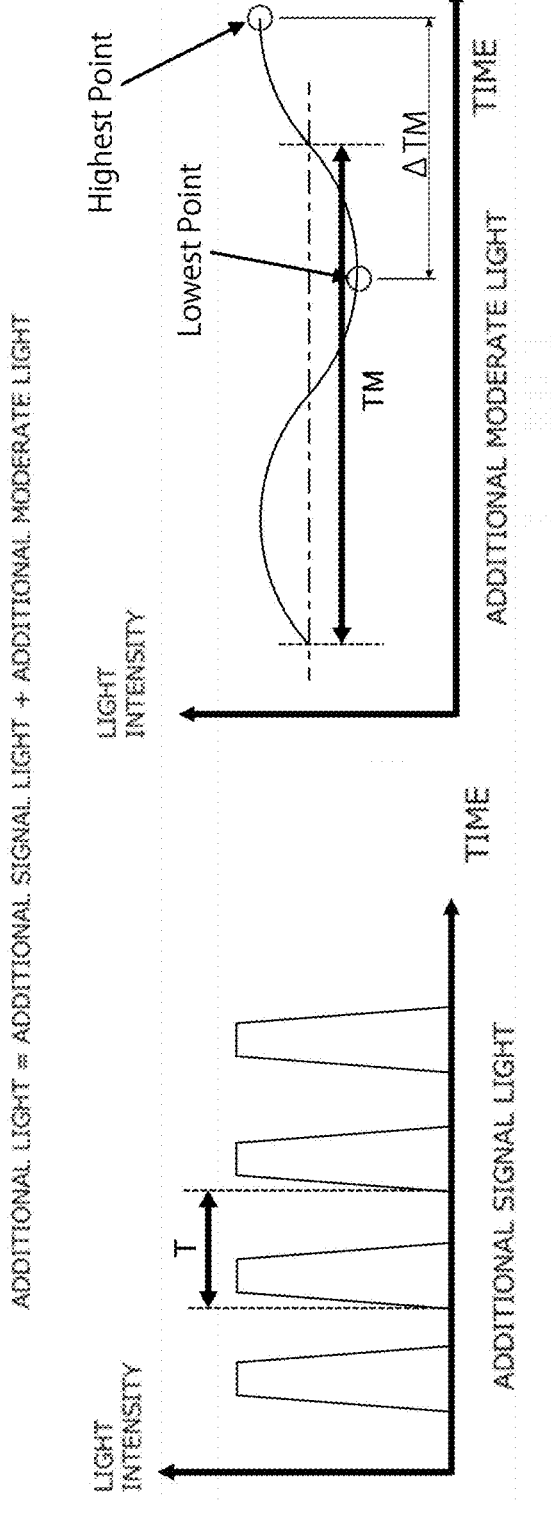
FIG. 4 is an explanatory view schematically illustrating signal light and moderate light.

In the present embodiment, in addition to this, light (additional moderate light) of which a light intensity changes more gently than that of the additional signal light (left side in FIG. 2) is synthesized with the additional signal light according to a desired photosynthesis promoting effect. Putting it another way, the light intensity of the additional moderate light changes more slowly than that of the additional signal light. As illustrated on the right side of FIG. 4, the additional moderate light has a sinusoidal waveform, and a basic period TM (or wave fluctuation period TM of the light intensity of the additional wave light) is 1 ms or more. The period of the additional signal light is $8 \text{ }\mu s < TM < 200 \text{ }\mu s$, and the basic period of the additional moderate light is 125 to 2 times or more the period TS of the additional signal light. The additional moderate light can also be described as light having a waveform with a small change rate (light intensity change rate) related to the slope of intensity as compared with the additional signal light. Putting it another way, the light intensity of the additional moderate light changes more slowly than the light intensity of the additional signal light. In addition, the additional moderate light can also be described as light having a gentler light intensity change rate as a whole as compared with the additional signal light, in a case of comparing with the additional signal light using a waveform of one period as illustrated in FIG. 4. The additional moderate light is light for moderating an influence of a side effect (such as suppression of plant growth by strong light stimulation) of the additional signal light of which an intensity changes relatively rapidly. Therefore, the temporal change of the additional moderate light should be gentler than the temporal change of the light intensity of the additional signal light. When comparing two rising periods of the two lights, it is understood that the rising period ($\Delta T_1$) of the additional signal light shown in FIG. 2 looks steep, on the other hand, the rising period ($\Delta$TM) of the additional moderate light, which is determined from the lowest point to the following highest point in the wave shape, is longer than the rising period ($\Delta T_1$) of the additional signal light. It means that the light intensity of the additional moderate light changes more gentle or more slowly than the additional signal light. In the present invention, the rising period ($\Delta$TM) of the additional moderate light needs to be at least twice longer than the rising period ($\Delta T_1$) of the additional signal light.

As described above, by irradiating a plant with the additional light obtained by combining the additional signal light with the additional moderate light, the photostress that a plant feels can be further alleviated as compared with a case where irradiation is performed with the additional signal light alone. That is, the additional light of the present embodiment is light that can improve a photostress reduction effect by the additional light as much as possible by combining the additional signal light with the additional moderate light.

The additional signal light is light that repeats turning-on and turning-off at a predetermined period. The additional moderate light is light having substantially constant intensity. In the present embodiment, the additional moderate light may slightly include a ripple having a frequency of about 60 Hz.

It is considered that the additional signal light of the present embodiment can alleviate the photostress on a plant as compared with the pulsed light of the prior art. However, by adding not only the additional signal light of the present embodiment but also light of another aspect (here, additional moderate light), the photostress given to a plant by the additional light can be more effectively reduced.

In order to alleviate the photostress caused by the additional signal light as much as possible, it is desirable that the PPFD of the additional moderate light be equal to or more than that of the additional signal light. The wavelength ranges (wavelength bands) of the additional signal light and the additional moderate light may be the same as or different from each other. In both cases, a photosynthesis promoting effect is obtained. However, it is desirable that the wavelength band of the additional signal light and the wavelength band of the additional moderate light have a common portion (overlapping portion) (at least a part of the wavelength band is common).

When describing the intensities of light, the intensities should be defined based on representative values that reasonably characterize the lights. With respect for the additional signal light, the peak point (or peak value) may be reasonable, and an average point or a median point could be useful. With respect for the additional moderate light, the average point, median point or peak point of the light may be reasonable. In this invention, the intensity of the additional signal light and the intensity of the additional moderate light need to be lower than the light compensation point of the target plant.

A plant is sensitive to a change in light intensity over time. Therefore, when a plant is irradiated with the additional signal light and the additional moderate light at the same time, the plant preferentially detects photosynthesis by the additional signal light. Such a plant response is defined as a cocktail party effect in plant light sensing.

When photosynthesis weaker than photosynthesis by main light occurs periodically, a plant recognizes that the plant is in a starvation state of photosynthesis, and DNA issues an instruction for chlorophyll synthesis of the optical antenna. As a result, a light use efficiency for photosynthesis is improved, and a photosynthesis rate increases although the PPFD of the main light due to sunlight or artificial light is constant. The increase in the photosynthesis rate is also observed in a case where irradiation is performed only with the additional signal light.

The photosynthesis promoting effect and a more stable growth promoting effect can be obtained by superimposing the additional moderate light that changes more slowly than additional signal light. Since the additional signal light is light that gives a trigger signal to DNA, there is no restriction on PPFD. On the other hand, the PPFD of the additional moderate light is desirably equal to or more than that of the additional signal light.

FIG. 3 illustrates an effect of pulsed light (additional signal light) of promoting biomass or useful substance production. As illustrated on the right side in an upper part of the drawing, a plant (illustrated by a leaf view in FIG. 3) is irradiated with additional signal light in addition to main light such as sunlight, and photosynthesis is promoted (indicated by circled numeral 1). Increased glucose flows under distribution ratio control to a translocation pathway (indicated by the circled number 2) used in basic metabolism for life maintenance and a secondary metabolic pathway (indicated by the circled number 3). Glucose is converted into biomass and a useful substance in each pathway.

As described above, the additional signal light has an effect of controlling the distribution ratio of glucose to the translocation pathway and the secondary metabolic pathway, in addition to the photosynthesis promoting effect.

Irradiation with the additional signal light may be performed in an arbitrary time period of 24 hours in one day, or may be performed in a predetermined time period. The wavelength of the additional signal light may be not only visible light but also any wavelength band from ultraviolet light to infrared light. In this wavelength band, a photosynthesis promoting effect is obtained. In general, a biomass increasing effect increases as the wavelength becomes shorter, and the secondary metabolism promoting effect increases as the wavelength becomes longer. In particular, light having a wavelength longer than 680 nm has a remarkable secondary metabolism promoting effect.

The photosynthesis promoting effect continues not only when irradiation with the additional signal light is performed but also after the irradiation is completed (cultivation promotion in high-speed growth mode). Therefore, by performing irradiation with the additional signal light in an arbitrary period from sowing to harvesting, a growth promoting effect can be obtained. Then, the growth promoting effect is also obtained after the irradiation is completed.

In addition, in a case where irradiation with the additional signal light and irradiation with the additional moderate light are performed at the same time, the additional moderate light alleviates the photostress caused by the additional signal light. Furthermore, leaves have a front surface and a back surface, respectively. Thus, in order to maximize growth promotion, it is desirable to irradiate the same surface (front surface or back surface) of a leaf with the additional light.

In a case where the same surface of a leaf is irradiated with the additional signal light and the additional moderate light, respective irradiation directions are not necessarily the same. For example, the same leaf surface (front surface or back surface) may be irradiated with the additional signal light and the additional moderate light, from different directions. However, in order to maximize the growth promotion, it is desirable to irradiate the same surface of a leaf with the additional signal light and the additional moderate light.

The plant cultivation method according to the present embodiment is effective for photosynthesis of all kinds of plants. Therefore, application can be made for the growth promotion of leaf vegetables, root vegetables, flowers, fruit trees, seaweeds, algae, and microalgae. Furthermore, it is effective for plant cultivation in a farm field, a greenhouse, a plant factory, a smart cell (smart cell industry, material production by living organisms), land aquaculture, a sea surface, undersea, a water surface, underwater, and a mountainous area.

<Plant Cultivation Apparatus 10>

Figure 5:
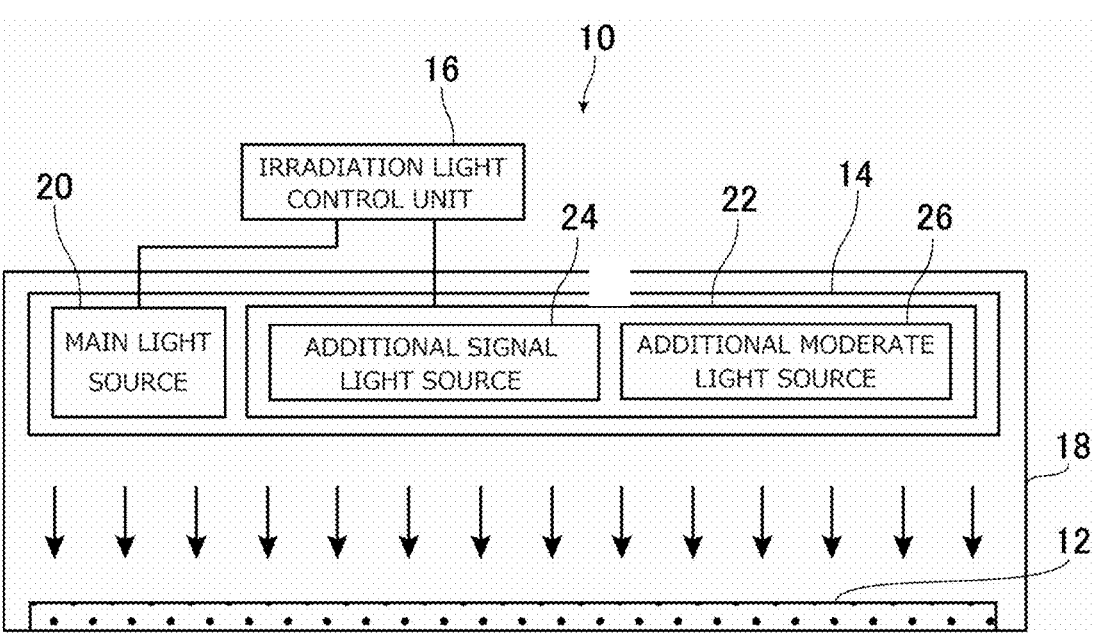
FIG. 5 is a schematic configuration view of a plant cultivation apparatus.

FIG. 5 illustrates a schematic configuration of a plant cultivation apparatus 10 of the present embodiment. The plant cultivation apparatus 10 includes a cultivation bed 12 for hydroponics or earthworks, a light irradiation unit 14 that irradiates the cultivation bed 12 with light, and an irradiation light control unit 16 that turns on and drives the light irradiation unit 14. The plant cultivation apparatus 10 includes a protective member 18 which covers the cultivation bed 12 to form a cultivation chamber. It is also possible to omit the protective member 18.

The light irradiation unit 14 includes a main light source 20 that performs irradiation with main light and an additional light source 22 that performs irradiation with additional light. The main light source 20 and the additional light source 22 are individually driven and controlled by a control (here, current control) of the irradiation light control unit 16. In FIG. 5, the main light source 20 and the additional light source 22 are illustrated side by side on the left and right, but irradiation with the light of the main light source 20 and the light of the additional light source 22 is performed toward the cultivation bed 12 through the same path via a diffusion plate (which may be a diffusion lens) (not illustrated). Irradiation with the light of the additional light source 22 may be performed toward the cultivation bed 12 via an optical fiber (not illustrated). As the optical fiber, an optical fiber having end surface emission or side surface emission can be appropriately used.

The main light source 20 lights up continuously within a predetermined time, and continuously emits main light (also referred to as "continuous irradiation light"). As the main light source 20, for example, an artificial light source such as an LED, a fluorescent lamp, a plasma lamp, a mercury lamp, an incandescent lamp, a metal halide lamp, a sodium lamp, an electrodeless lamp, or a pulsed oscillation laser is used.

It is also possible to use sunlight as another main light. In a case where sunlight is used, it is possible not to use the main light source 20 or to omit the main light source 20. It is also possible to use both sunlight and light of the main light source 20. In this case, the sunlight and the light of the main light source 20 may be properly used according to conditions such as a time period. Furthermore, the sunlight and the light of the main light source 20 may be emitted at the same time.

The additional light source 22 includes an additional signal light source 24 and an additional moderate light source 26. The additional signal light source 24 performs irradiations with the additional signal light, and the additional moderate light source 26 performs irradiation with the additional moderate light. The additional signal light and the additional moderate light constitute the additional light (FIG. 4).

In FIG. 5, the additional signal light source 24 and the additional moderate light source 26 are illustrated side by side on the left and right, but irradiation with the additional signal light and additional moderate light is performed toward the cultivation bed 12 through the same path via a diffusion plate (which may be a diffusion lens) (not illustrated). The additional light source 22 may be a light source formed by integrating and unifying the additional signal light source 24 and the additional moderate light source 26.

The additional light source 22 can emit light in a wavelength range of 220 nm to 2000 nm by the additional signal light source 24. As the additional signal light source 24, for example, various light sources such as an LED, an EL (electroluminescence), a laser, ultraviolet light, and infrared light can be adopted as long as light having a wavelength suitable for growth of plants as a cultivation target can be emitted. In addition, it is desirable to use a light source that facilitates pulse lighting control, as the additional signal light source 24. As the additional moderate light source 26, for example, various light sources such as a cold cathode fluorescent lamp, an LED monochromatic lamp, and an LED fluorescent lamp driven by a lamp line (50 Hz or 60 Hz) can be adopted.

Although not illustrated, the additional light source 22 may include a light source that emits continuous light and a shutter disposed in the middle of the optical path. In this case, the shutter intermittently blocks the optical path to form signal light. In addition, it is also possible to form light having a necessary wavelength by attaching a wavelength limiting filter to the white light source. The shutter or the filter may be provided in each of the additional signal light source 24 and the additional moderate light source 26.

The light irradiation unit 14 is installed above a ceiling surface or a side wall of the protective member 18, above a column installed on the cultivation bed 12, or the like. The light irradiation unit 14 illuminates the cultivation bed 12 in accordance with an instruction from the irradiation light control unit 16.

The light irradiation unit 14 can include a plurality of main light sources 20 and a plurality of additional light sources 22. In this case, a plurality of the main light sources 20 and a plurality of the additional light sources 22 can be arranged at different positions and at different irradiation angles. For example, a plurality of the main light sources 20 and a plurality of additional light sources 22 can be alternately arranged. In addition, it is also possible to include a plurality of the main light sources 20 and a single additional light source 22 (or a single main light source 20 and a plurality of the additional light sources 22). The additional light source 22 may be provided such that the cultivation bed 12 is irradiated with light from a plurality of directions. In this manner, a more stable growth promoting effect can be obtained.

As described above, by providing a plurality of the main light sources 20 and/or a plurality of the additional light sources 22, denser light irradiation can be performed. Thus, by making an arrangement or irradiation angles of a plurality of the light sources different from each other, it is possible to uniformly irradiate plants on the cultivation bed 12 with these lights, and it is possible to suppress growth unevenness depending on locations.

The denser light irradiation means one type of irradiation by which all the plants are designed to be evenly irradiated with the main light and the additional light. The irradiation can be implemented using many identical light sources that are arranged over the plants with an equal interval so that the light intensity reaching each of the plants is the same, but it can also be achieved by shifting the irradiated spots of lights using one or several light sources that keep moving at either all the time or periodically.

The irradiation light control unit 16 turns on and drives the light irradiation unit 14 on the basis of the plant cultivation method of the present embodiment. The irradiation light control unit 16 can turn on and drive only the main light source 20, turn on and drive only the additional light source 22, and simultaneously turn on and drive both the main light source 20 and the additional light source 22.

In a case where the light irradiation unit 14 includes a plurality of the main light sources 20 and/or a plurality of the additional light sources 22, the irradiation light control unit 16 can synchronously turn on the same kind of light sources. In addition, in a case where the cultivation bed 12 is divided into a plurality of blocks (test sections), the irradiation light control unit 16 can individually control the main light source 20 and the additional light source 22 in each of the blocks.

The irradiation light control unit 16 may synchronize the main light source 20 and the additional light source 22 in units of blocks, or may synchronize the main light source 20 and the additional light source 22 of a plurality of blocks or all blocks. By synchronizing the additional signal light in the additional light source 22, the duty ratio of the additional signal light with which a plant is irradiated can be accurately maintained.

Such a plant cultivation apparatus 10 can be widely applied to a small cultivation kit for easily cultivating a plant in a house in a general home, an agricultural greenhouse, a large plant factory having a constructed cultivation room, and the like.

Here, the agricultural greenhouse may be an agricultural plastic greenhouse in which a film having translucency is stretched over the entire surface of the greenhouse, or an agricultural glass greenhouse in which a film is stretched and spread over the entire inner surface of a glass window. In the agricultural glass greenhouse, air containing moisture in a cultivation space in the greenhouse passes through a film and exits the greenhouse through a gap between the glass window and a framework portion of the glass window.

light is increased. A similar effect of improving the irradiation efficiency can be obtained even in a small cultivation kit or a plant factory.

In addition, the effective irradiation direction of the additional light (additional signal light and/or additional moderate light) can also be considered. The growth promoting effect can be obtained in both cases where irradiation with the additional light is performed in the same direction as that of the main light and where irradiation with the additional light is performed in a direction different from that of the main light. Furthermore, when a place where main light does not sufficiently reach (for example, a leaf surface on the front and back sides of a leaf located in the shade, a back surface of a leaf in a place exposed to the sun, and the like) is irradiated with the additional light, a larger growth promoting effect can be obtained.

Specifically, for example, a plant having branches extending in a horizontal direction, such as grapes, is irradiated with the additional light in an upward direction (including an obliquely upward direction) from the ground. In this case, the light striking the back side of the leaf (the surface on a ground side) in the shade increases. Thus, photosynthesis is actively performed and a sweet taste of grapes is increased as compared with a case where irradiation with the additional light is not performed. As described above, by setting the irradiation direction of the additional light according to an environment in which a plant is cultivated, characteristics of a plant, and the like, the growth of plants can be more effectively promoted. For example, in tomato cultivation, it is also effective to provide side emission optical fibers inside a bush and perform irradiation with the additional light.

<Comparison Between Prior Art and Present Embodiment>

Table 1 below shows a comparison between the prior art (technical matters disclosed in Patent Literature 1 described above) and basic technical matters of the plant cultivation method according to the present embodiment.

TABLE 1

| Comparison Item | Prior Art | Embodiment |
|---|---|---|
| Main light (main-light) | Sunlight and artificial light | Sunlight and artificial light |
| Period of additional signal light | 2 μs to 500 μs | 8 μs to 200 μs |
| Duty ratio of additional signal light | 20% or less | Not limited |
| Photosynthesis photon density of additional signal light ($\mu mol \cdot m-2 \cdot s-1$) | 0.001 to 4.0 | Not limited |
| Kind of light to be added to main light | One kind | Two kinds (additional signal light and additional moderate light) |
| Wavelength band | 400 nm to 500 nm | 220 nm to 2000 nm |
| Irradiation period | Growth period after planting | Sowing to seedling growing period to growing period |
| Irradiation time period in one day | Night time | Arbitrary time period among 24 hours |
| Effect | Growth promotion and useful components increase | Individual control of growth and useful component production |

Therefore, even in the agricultural glass house, it is possible to suppress high temperature and high humidity in the greenhouse. The above-stated "translucency" means a property of transmitting light necessary for growing a plant in daytime.

In a case where the light source of the additional light (the additional light source 22 in this case) is installed in an agricultural greenhouse, a part of the additional light is reflected and diffused (reflected and diffused) by a glass plate, a resin plate, a resin film, or the like, and thus there is an advantage that irradiation efficiency of the additional As shown in Table 1, the main light is sunlight and artificial light (such as LED) in both the prior art and the present embodiment. A period of the additional signal light is 8 μs to 500 μs in the prior art, and 8 μs to 200 μs in the present embodiment. A duty ratio of the additional signal light is limited to 20% or less in the prior art, but is not limited in the present embodiment.

The photosynthesis photon density ($\mu mol \cdot m^{-2} \cdot s^{-1}$) of the additional signal light is limited to 0.001 to 4.0 in the prior art, but is not limited in the present embodiment. Regarding a kind of light to be added to the main light, there is one kind in the prior art, and there are two kinds of the additional signal light and the additional moderate light in the present embodiment. A wavelength band is 400 nm to 500 nm in the prior art, and 220 nm to 2000 nm in the present embodiment.

An irradiation period is a growth period after planting in the prior art, and is an arbitrary period (including the entire period) from sowing to a seedling growing period and a growing period in the present embodiment. A period from sowing to planting is defined as a seedling growing period, and a period from planting to harvesting is defined as a growth period. In the present invention, it is preferred that the irradiation period of the additional light is equal to or longer than half the seedling growing period. Also, it is preferred that the irradiation period of the additional light is equal to or longer than half the growth period.

The irradiation time period in one day is a time period during the night time in the prior art, and is an arbitrary time period among 24 hours in one day in the present embodiment. Regarding technical effects, the prior art enables promotion of growth and an increase in useful components, and the present embodiment enables individual control of growth and useful component production.

In addition, although not described in Table 1, in the prior art, a relatively strong stimulus is given to a plant by pulsed light. In addition, since a wavelength band of the pulsed light is limited to a blue wavelength band, it is difficult for light to reach a hidden leaf in a situation where leaves overlap. Furthermore, it is difficult to individually control growth and secondary metabolism (independently control a growth rate and a useful substance production).

On the other hand, in the present embodiment, due to the superimposition of the blinking light (additional signal light) and the gently changing light (additional moderate light), the stimulation given to the plant is less than that in the prior art. Then, the plant cultivation method and the plant cultivation apparatus 10 of the present embodiment can individually control growth and secondary metabolism. Individual control of growth and secondary metabolism can be performed by changing a wavelength or a light intensity of the additional signal light or the additional moderate light.

Note that the present embodiment is merely an example of implementation in carrying out the present invention, and the technical scope of the present invention should not be interpreted in a limited manner. That is, the present invention can be implemented in various forms without departing from the gist or main features thereof.

<Various Examples of Plant Cultivation Method>

Hereinafter, embodiments of the present invention will be described in detail with reference to Examples. However, the present invention is not limited by the following description.

Example 1

In Example 1, an influence of additional light irradiation on growth of a lettuce was examined.

First, seeds of the lettuce were sown on a sponge containing water, stored in a dark place for 3 days, and then irradiated with main light for 7 days to grow seedlings. Next, the seedlings were planted in a hydroponic cultivation kit and cultivated for 28 days. During cultivation, a temperature and humidity were kept at 22° C. and 40% to 50%, respectively. For liquid fertilizer, Hyponex (registered trademark: liquid fertilizer manufactured by Hyponex Japan K.K.) was diluted 1000 times and used.

The lettuce was irradiated with two kinds of main light and additional light. The additional light is light obtained by combining additional signal light and additional moderate light.

In 24 hours of one day, irradiation with the main light was performed from 0:00 to 12:00, and irradiation with the additional light was performed from 6:00 to 14:00. PPFD ($\mu$mol·m$^{-2}$·s$^{-1}$) of each kind of light was 220 for the main light, 0.01 for the additional signal light, and 0.01 for the additional moderate light.

Irradiation with the main light was performed from 3$^{rd}$ day to 38$^{th}$ day after sowing, and irradiation with the additional light was performed from 10$^{th}$ day to 38$^{th}$ day after planting.

Hereinafter, a test in which cultivation is performed only with main light is referred to as a control (hereinafter, it may be abbreviated as "CNT"), and a test in which irradiation with additional light is performed is referred to as a comparative test.

In the present Example 1, the following three types of Comparative Tests "1." to "3." were performed.

1. Comparative Test 1: Irradiation with additional light having a wavelength range of 350 nm to 600 nm 2. Comparative Test 2: Irradiation with additional light having a wavelength range of 600 nm to 800 nm 3. Comparative Test 3: Irradiation with additional light in wavelength ranges of 380 nm to 500 nm and 670 nm to 1000 nm In Comparative Test 1 to Comparative Test 3 described above, parameters of the additional signal light were fixed to the following values.

$$T = 25 \ \mu s, \Delta T_1 = 2 \ \mu s, \Delta T_2 = 2 \ \mu s, \text{ and } \Delta T_3 = 2 \ \mu s$$

Here, T, $\Delta T_1$, $\Delta T_2$, and $\Delta T_3$ have the same meanings as those described with reference to FIG. 2.

Harvest was performed on the 38$^{th}$ day after sowing, a harvest wet weight of a portion excluding roots was measured, and a wet weight ratio was calculated by the following Equation (1). The wet weight was determined from an average value of five strains.

[Harvest wet weight ratio] = Harvest wet         (1)

weight of test section/Harvest wet weight of control (*CNT*)

A weight of ascorbic acid (vitamin C) contained per 1 g of the harvest wet weight of the lettuce was quantitatively analyzed by a high performance liquid chromatography apparatus (hereinafter, an HPLC apparatus). The ascorbic acid ratio was calculated by Equation (2).

[Ascorbic acid weight ratio] = Ascorbic acid weight of test section/Wet ascorbic acid weight of control (*CNT*)

15

A total weight ratio of the ascorbic acid contained in the lettuce was calculated by the following Equation (3).

$$[\text{Total ascorbic acid weight ratio}] = [ \quad (3)$$

$$\text{Harvest wet weight ratio}] \times [\text{Ascorbic acid weight ratio}]$$

Table 2 shows calculation results of the harvest wet weight ratio, the ascorbic acid weight ratio, and a total ascorbic acid weight ratio in each comparative test.

TABLE 2

|  | Harvest Wet Weight Ratio | Ascorbic Acid Weight Ratio | Ascorbic Acid Total Weight Ratio |
|---|---|---|---|
| Comparative Test 1-1 | 1.6 ± 0.1 | 1.2 ± 0.1 | 1.9 ± 0.1 |
| Comparative Test 1-2 | 1.3 ± 0.1 | 1.4 ± 0.1 | 1.8 ± 0.1 |
| Comparative Test 1-3 | 1.0 ± 0.1 | 1.6 ± 0.1 | 1.6 ± 0.1 |

According to the present Example 1, from the results of the "harvest wet weight ratio" and the "ascorbic acid weight ratio" representing a ratio to control (CNT), the irradiation with additional light (additional light irradiation) has an effect of increasing the harvest wet weight of the lettuce and ascorbic acid as a secondary metabolic component. Furthermore, from the results of Comparative Test 1 and Comparative Test 2, the additional light irradiation has an effect of increasing the harvest weight as the wavelength is shorter, and has an effect of increasing the secondary metabolism as the wavelength is longer.

Example 2

In Example 2, an influence of additional signal light irradiation on growth of a lettuce was examined.

First, seeds of the lettuce were sown on a sponge containing water, stored in a dark place for 3 days, and then irradiated with main light for 7 days to grow seedlings. Next, the seedlings were planted in a hydroponic cultivation kit and cultivated for 10 days. During cultivation, a temperature and humidity were kept at 22° C. and 40% to 50%, respectively. For liquid fertilizer, Hyponex (registered trademark: liquid fertilizer manufactured by Hyponex Japan K.K.) was diluted 1000 times and used.

The lettuce was irradiated with two kinds of main light and additional light.

In 24 hours of one day, irradiation with the main light was performed from 0:00 to 12:00, and irradiation with the additional light was performed from 10:00 to 18:00.

Irradiation with the main light was performed for 20 days from sowing, and irradiation with the additional light was performed for 10 days from sowing to planting.

The PPFD ($\mu$mol·m$^{-2}$·s$^{-1}$) of the main light was set to 220 for 10 days until planting and set to 20 for 10 days after planting.

PPFD ($\mu$mol·m$^{-2}$·s$^{-1}$) of the additional light was 0.01 for the additional signal light, and 0.02 for the additional moderate light. Irradiation was performed for 10 days after sowing. Parameters of the additional signal light were fixed to the following values.

$$T = 30 \ \mu s, \Delta T_1 = 2 \ \mu s, \Delta T_2 = 2 \ \mu s, \text{ and } \Delta T_3 = 5 \ \mu s$$

16

A comparative test (Comparative Test 1) was performed under the following conditions.

Comparative Test 1: Irradiation with additional light having a wavelength range of 400 nm to 600 nm As a result of Comparative Test 1, regarding a wet weight at the time of planting, there was no significant difference between the test section of the control (CNT) and the test section irradiated with the additional signal light.

Figure 6:
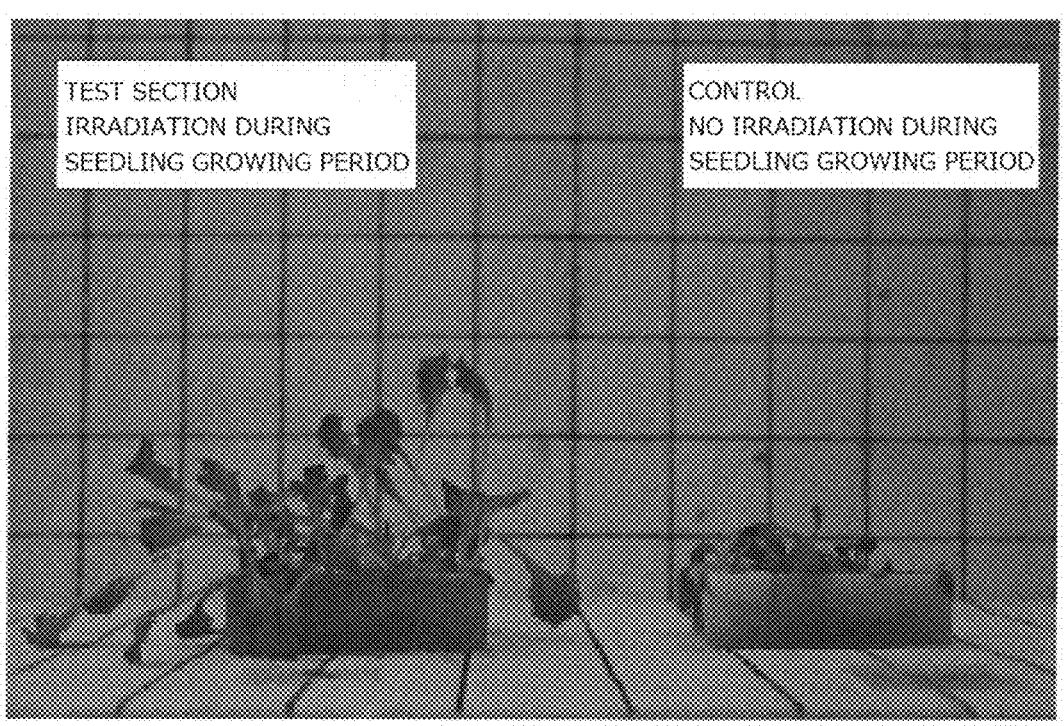
FIG. 6 is an explanatory view illustrating an experimental result of Example 2 by an image.

FIG. 6 illustrates an outline comparison of the lettuce harvested by performing Comparative Test 1. The lettuce on the left side (test section, and irradiation during seedling growing period) in FIG. 6 is the lettuce of the test section irradiated with the main light and the additional light (additional signal light and additional moderate light), and the lettuce on the right side (control, and no irradiation during seedling growing period) in FIG. 6 is the lettuce of the test section irradiated only with the main light. The lettuce according to Comparative Test 1 (left side in FIG. 6) is much larger than that of the CNT (right side in FIG. 6).

Harvest was performed on the 20$^{th}$ day after sowing, and a harvest wet weight of a portion excluding roots was measured.

The harvest wet weight was determined from an average value of five strains. The wet weight ratio was calculated by Equation (1) described in Example 1.

The harvest wet weight ratio in Comparative Test 1 of Example 2 was 22±0.1.

According to the present Example 2, it was found that when irradiation with the additional light (the additional signal light and the additional moderate light) was performed only in the period from sowing to planting, thereafter, the growth was promoted even under the irradiation of the main light having a PPFD of 20 ($\mu$mol·m$^{-2}$·s$^{-1}$).

The light compensation point of the lettuce is PPFD=about 20 ($\mu$mol·m$^{-2}$·s$^{-1}$). Therefore, even if the lettuce is irradiated with main light having a PPFD of 20 ($\mu$mol·m$^{-2}$·s$^{-1}$), the lettuce cannot be sufficiently grown.

The present Example 2 is a proof that the promoting effect is continued even after the irradiation with the additional light only for a certain period of time.

Example 3

In Example 3, an influence of a period of the additional signal light (additional signal light period) on growth of a lettuce was examined.

First, seeds of the lettuce were sown on a sponge containing water, stored in a dark place for 3 days, and then irradiated with main light for 7 days to grow seedlings. Next, the seedlings were planted in a hydroponic cultivation kit and cultivated for 28 days. During cultivation, a temperature and humidity were kept at 22° C. and 40% to 50%, respectively. For liquid fertilizer, Hyponex (registered trademark: liquid fertilizer manufactured by Hyponex Japan K.K.) was diluted 1000 times and used.

Irradiation with the main light was performed from 3$^{rd}$ day to 38$^{th}$ day after sowing, and irradiation with the additional light was performed from 10$^{th}$ day to 38$^{th}$ day after planting.

In 24 hours of one day, irradiation with the main light was performed from 0:00 to 12:00, and irradiation with the additional light was performed from 6:00 to 14:00. PPFD ($\mu$mol·m$^{-2}$·s$^{-1}$) of each kind of light was 220 for the main light, 0.15 for the additional signal light, and 0.01 for the additional moderate light.

The wavelength range of the additional signal light was 380 nm to 600 nm. The wavelength range of the additional moderate light was 500 nm to 680 nm.

In the control (CNT), irradiation only with main light was performed. The PPFD of the main light was 0.15 ($\mu$mol·m$^{-2}$·s$^{-1}$).

In the comparative test, the PPFD of the additional signal light was fixed at 0.05 ($\mu$mol·m$^{-2}$·s$^{-1}$), and T from Comparative Test 1 to Comparative Test 6 was changed in a range of 8 $\mu$s to 500 $\mu$s. In this case, parameters of the additional signal light changed as follows: $\Delta T_1$=1 s, $\Delta T_2$=1 $\mu$s, and $\Delta T_3$=(T−2) $\mu$s. A duty ratio of the additional signal light is 1.0. The PPFD of the additional moderate light was fixed at 0.10 ($\mu$mol·m$^{-2}$·s$^{-1}$).

Table 3 shows test results of Example 3.

TABLE 3

| | | | PPFD ($\mu$mol · m−2 · s−1) | | |
|---|---|---|---|---|---|
| | T ($\mu$s) | Duty Ratio of Additional Light | Additional Signal Light | Additional Moderate Light | Wet Weight Ratio (CNT/Comparative Test Section) |
| Control | — | 100 | — | 0.15 | 1.0 |
| Comparative Test 3-1 | 5 | 100 | 0.05 | 0.10 | 1.0 ± 0.1 |
| Comparative Test 3-2 | 8 | 100 | 0.05 | 0.10 | 1.5 ± 0.1 |
| Comparative Test 3-3 | 50 | 100 | 0.05 | 0.10 | 1.7 ± 0.1 |
| Comparative Test 3-4 | 100 | 100 | 0.05 | 0.10 | 1.4 ± 0.1 |
| Comparative Test 3-5 | 200 | 100 | 0.05 | 0.10 | 1.1 ± 0.1 |
| Comparative Test 3-6 | 500 | 100 | 0.05 | 0.10 | 1.0 ± 0.1 |

According to the present Example 3, it was found that the harvest wet weight of the lettuce depended on the period of the additional signal light (see each value of "Wet weight ratio"), and T increased in the range of 8 to 200 s. Furthermore, it was found that the highest effect was obtained at T in the range of 8 s to 100 s.

Example 4

In Example 4, an influence of additional light irradiation on growth of Euglena was examined.

Euglena Gracilis was placed in a flask filled with an aqueous solution obtained by diluting HYPONeX (registered trademark) 1000 times. A water temperature was kept at 27° C. An initial concentration of Euglena was 1 $\mu$g/L. Four flasks were prepared, and each flask was charged with the same amount of Euglena.

The Euglena was cultivated for 10 days.

In 24 hours of one day, irradiation with the main light was performed from 0:00 to 12:00, and irradiation with the additional light was performed from 6:00 to 13:00.

PPFD ($\mu$mol·m$^{-2}$·s$^{-1}$) of the additional light was 0.001 for the additional signal light, and 0.002 for moderate light.

Parameters of the additional signal light were set as follows: T=8 $\mu$s, $\Delta T_1$=1 $\mu$s, $\Delta T_2$=1 $\mu$s, and $\Delta T_3$=1 $\mu$s.

Flask 1 was used as a test section for the control (CNT), and flasks 2, 3, and 4 were used as test sections for a comparative test.

A size of a single body, the number of individuals, and a paramylon content of Euglena after completion of light irradiation for 10 days were measured.

From measurement results of the number of individuals and the paramylon content, a ratio of the number of individuals was obtained by the following Equation (4). A paramylon amount ratio was determined by the following Equation (5).

$$[\text{Ratio of number of individuals}] = \text{Number of individuals in test section/Number of individuals in control} \tag{4}$$

$$[\text{Paramylon weight ratio}] = \text{Weight of paramylon in test section/Weight of paramylon in control} \tag{5}$$

The size of the Euglena single body was almost the same regardless of test conditions.

Table 4 shows the parameters of the main light and the additional light, the ratio of the number of individuals, and the paramylon ratio.

TABLE 4

| | Main Light PPFD | Additional Light PPFD ($\mu mol \cdot m-2 \cdot s-1$) | | | | |
| | | Additional Signal Light | Additional Moderate Light | Wavelength Range (nm) | Ratio of Number of Individuals | Paramylon Weight Ratio |
| --- | --- | --- | --- | --- | --- | --- |
| Control | 80 | — | — | — | 1 | 1 |
| Comparative Test 4-1 | — | 0.005 | 0.005 | 400 to 500 | 3.2 ± 0.1 | 3.0 ± 0.1 |
| Comparative Test 4-2 | — | 0.005 | 0.005 | 450 to 600 | 4.2 ± 0.1 | 4.4 ± 0.1 |
| Comparative Test 4-3 | — | 0.005 | 0.005 | 600 to 1000 | 2.8 ± 0.1 | 3.2 ± 0.1 |

According to present Example 4, the "ratio of the number of individuals" and the "paramylon weight ratio" in all the comparative tests were increased more than those of the control (CNT). Thus, the additional light has an effect of promoting the growth of the microalgae Euglena and the paramylon synthesis. In Table 4, the PPFD of the main light is indicated by "—" for Comparative Tests 4-1 to 4-3. Irradiation with the additional light is performed in addition to the main light, and in Comparative Tests 4-1 to 4-3 in Table 4, as described above, irradiation with the main light is performed from 0:00 to 12:00.

Example 5

In Example 5, an influence of the presence or absence of the additional light in the seedling growing period of red cyanin weight ratio were calculated by the following Equations (6) and (7), respectively.

$$[\text{Harvest weight ratio}] = \qquad (6)$$

Harvest weight of test section/Harvest weight of control $$[\text{Anthocyanin weight ratio}] = \qquad (7)$$

Anthocyanin weight in test section/Anthocyanin weight in control

Table 5 shows parameters of the main light and the additional light, the harvest weight ratio, and the anthocyanin weight ratio.

TABLE 5

| | Main Light PPFD | Additional Light PPFD ($\mu mol \cdot m-2 \cdot s-1$) | | | | |
| | | Additional Signal Light | Additional Moderate Light | Wavelength Range (nm) | Harvest Weight Ratio | Anthocyanin Weight Ratio |
| --- | --- | --- | --- | --- | --- | --- |
| Control | 200 | — | — | 380 to 780 | 1 | 1 |
| Comparative Test 5-1 | — | 0.01 | 0.005 | 400 to 500 | 1.7 ± 0.1 | 1.6 ± 0.1 |
| Comparative Test 5-2 | — | 0.01 | 0.005 | 450 to 600 | 1.8 ± 0.1 | 1.7 ± 0.1 | perilla on the growth after planting in a farm field (farm field planting) was examined. The seedling growing period has the same meaning as described in Example 2, and is a period during which seedlings having a certain size are grown from sowing. The farm field is a farm where cultivation is performed by sunlight.

The seedling growing period was 10 days, and the cultivation period in the farm field was 60 days. A control (CNT) in which irradiation only with the main light was performed and a comparative test in which irradiation with the main light and the additional light were performed were carried out during the seedling growing period.

In 24 hours of one day, irradiation with the main light was performed from 6:00 to 18:00, and irradiation with the additional light was performed from 15:00 to 23:00. After planting in the farm field, cultivation was performed only by sunlight.

From a harvest weight of the red perilla and an anthocyanin pigment weight, a harvest weight ratio and an antho- In the farm field cultivation, in the red perilla seedling irradiated with additional light only in the seedling growing period, the harvest weight was increased 1.7 times to 1.8 times, and the anthocyanin weight was increased 1.6 times to 1.7 times as compared with the seedling of the control.

According to the present Example 5, the additional light irradiation only in the seedling growing period in the cultivation of the red perilla has an effect of promoting both the growth and the secondary metabolite synthesis, in a case where farm field planting is performed after the additional light irradiation and farm field cultivation is performed by sunlight. For the promotion of growth, see the respective test results of "Harvest weight ratio" in Table 5. For the promotion of secondary metabolite synthesis, see also the respective test results of "Anthocyanin weight ratio" in Table 5. In Table 5, the PPFD of the main light is indicated by "—" for Comparative Tests 5-1 and 5-2. Irradiation with the additional light is performed in addition to the main light, and in Comparative Tests 5-1 and 5-2 in Table 5, as described above, irradiation with the main light is performed.

Example 6

In Example 6, an influence of the presence or absence of the moderate light on growth of a lettuce was examined.

During the seedling growing period of the lettuce, seedlings were grown by performing irradiation only with the main light for 10 days.

The seedlings were planted in a hydroponic cultivation kit, and for a period of 28 days, a control test of irradiation only with the main light and a comparative test of irradiation with the main light and the additional light were performed.

A cultivation environment of the lettuce was set to be the same as that in Example 1.

The harvest wet weight ratio of the harvested lettuce was calculated by the same method as in Example 1.

The parameters of the additional signal light were set to $T=40$ μs, $\Delta T_1=2$ μs, $\Delta T_2=1$ μs, and $\Delta T_3=2$ μs.

Table 6 shows parameters of the main light and the additional light and a harvest wet weight ratio when the PPFD of the main light is 10 ($\mu mol \cdot m^{-2} \cdot s^{-1}$). It can be seen that the growth of the lettuce is significantly inhibited in an environment without the moderate light.

TABLE 6

| | Additional Light | | | | |
| | PPFD (μmol · m−2 · s−1) | | | | |
| | Main Light PPFD | Additional Signal Light | Additional Moderate Light | Wavelength Range (nm) | Harvest Weight Ratio |
|---|---|---|---|---|---|
| Control | 10 | — | — | 380 to 780 | 1 |
| Comparative Test 6-1 | — | 10 | 0 | 400 to 600 | 0.3 ± 0.1 |

Table 7 shows parameters of the main light and the additional light and a harvest wet weight ratio when the PPFD of the main light is 20 ($\mu mol \cdot m^{-2} \cdot s^{-1}$). Due to the presence of the moderate light, the "Comparative Test 6-2" had a growth effect 1.6 times larger than the "Control".

TABLE 7

| | Additional Light | | | | |
| | PPFD (μmol · m−2 · s−1) | | | | |
| | Main Light PPFD | Additional Signal Light | Additional Moderate Light | Wavelength Range (nm) | Harvest Weight Ratio |
|---|---|---|---|---|---|
| Control | 20 | — | — | 380 to 780 | 1 |
| Comparative Test 6-2 | 0 | 10 | 10 | 450 to 600 | 1.6 ± 0.1 |

According to present Example 6, it can be seen that the moderate light has an effect of alleviating the light stimulus of the signal light. The PPFD of the main light is indicated by "−" for Comparative Test 6-1 in Table 6. In addition, the PPFD of the main light is indicated by "0" for Comparative Test 6-2 in Table 7. Irradiation with the additional light is performed in addition to the main light, and in Tables 6 and 7, as described above, irradiation with the main light is performed.

<Irradiation Time of Additional Moderate Light>

As described above, the additional light is at least one among the additional signal light and the additional moderate light. Therefore, the irradiation with the additional moderate light does not necessarily need to be performed with the additional signal light at the same time. Even when the irradiation with the additional moderate light is performed after the additional signal light (for example, from immediately after the additional signal light to about 10 hours later), the effect of promoting plant cultivation is obtained.

<Cultivation Performed in a Plurality of Steps>

<<Growth of Seedling>>

According to the knowledge of the inventors, the additional light has an effect of promoting the growth of all kinds of plants. Therefore, when the farm field is irradiated with the additional light, not only the growth of a plant which is a cultivation target but also the growth of a plant which is not a cultivation target may be promoted in some cases. In the farm field cultivation, a plant which is not a cultivation target is generally called a weed. In the farm field cultivation, survival competition between a plant which is a cultivation target and the weed occurs. When the weed propagates, growth of a cultivation target may be inhibited. In order to prevent this, cultivation may be performed in two steps of seedling growing and farm field cultivation.

Figure 7:
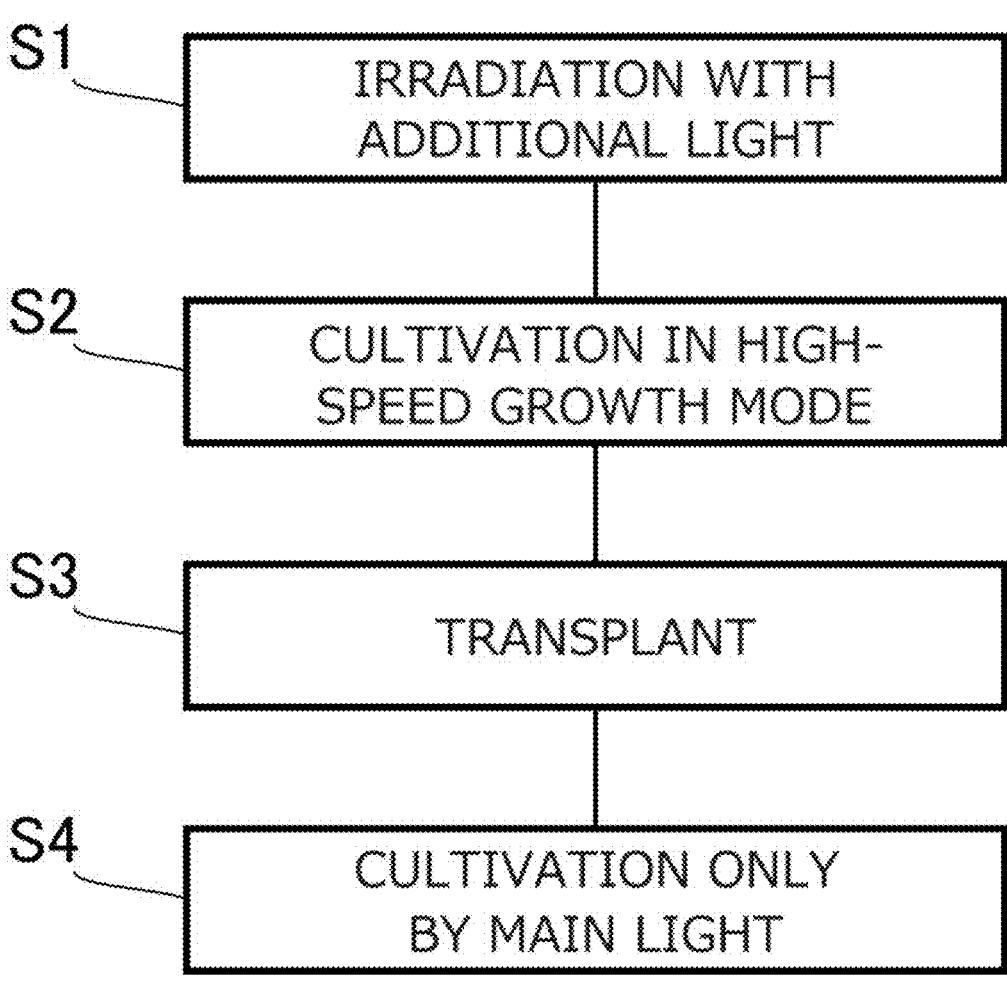
FIG. 7 is a flowchart showing a procedure of seedling growth performed in two steps.

First, in a first step, irradiation with the additional light is performed during seedling growing (Step (S)1 in FIG. 7), and seedlings are grown in a high-speed growth mode (S2). Then, in the first step, after completion of the irradiation with additional light (S1), seedlings are grown in a high-speed growth mode (S2).

Here, the "high-speed growth mode" means a state in which the growth of plants is promoted even after the end of the irradiation with the additional light. That is, as described above, the photosynthesis promoting effect continues not only when irradiation with the additional signal light is performed but also after the irradiation is completed. Thus, by performing irradiation with the additional signal light in an arbitrary period from sowing to harvesting, a growth promoting effect can be obtained. This is also supported by Example 2 and Example 5 described above.

Subsequently, in a second step, seedlings grown in a high-speed growth mode are transplanted into a farm field (S3), and the seedlings are cultivated only by sunlight (or artificial light) which is the main light (S4). In this manner, only the growth of the plant which is a cultivation target can be preferentially (selectively) promoted. In the example of FIG. 7, S1 and S2 belong to the first step, and S3 and S4 belong to the second step.

<<Selective Growth of Beneficial Phytoplankton>>

In Example 4 described above, it has been shown that the additional light irradiation is effective for the growth of Euglena (Euglena). The Euglena is a species of phytoplankton.

When explaining more specifically, in general, an organism that performs photosynthesis is classified as a photosynthetic organism. It can be said that the photosynthetic organism is an organism that grows by converting light energy into energy (mainly chemical free energy) in a form that can be used biologically. The photosynthetic organism can be classified as shown in Table 8.

plant cultivation apparatus 10 illustrated in FIG. 5 can be referred to as a photosynthetic organism cultivation apparatus, a photosynthetic organism growing apparatus, or the like. Furthermore, the "growth" related to a photosynthetic organism can be rephrased as the "production".

For example, bivalves such as clams or large clams feed on phytoplankton. Some phytoplankton have a poison, such as Noctiluca, Ceratium, and Chattonella. When the bivalves eat phytoplankton having such a poison, the poison is accumulated in the body, and the clam is poisoned. In addition, the Chattonella adsorbs to the gills of a fish and suffocates the fish.

Various phytoplankton inhabit fresh water (lakes, rivers, and the like) and sea water. When fresh water or sea water is irradiated with additional light, not only beneficial phytoplankton but also harmful phytoplankton may grow.

In order to grow only phytoplankton beneficial (nontoxic) to the bivalves, it is effective to grow phytoplankton in multiple steps (for example, two steps). First, as a first step, beneficial and fast growing phytoplankton are grown in a specific environment. As a second step, beneficial phytoplankton are grown in fresh water or sea water.

TABLE 8

| Photosynthetic Organism | | |
|---|---|---|
| Eukaryotes | | Prokaryotes |
| Oxygen-Generating Photosynthesis | | Photosynthesis Without Releasing Oxygen |
| Photolithotrophy | Photolithotrophy | Photolithotrophy and Photoorganotrophy |
| [Chl a + b] | Eubacteria | Eubacteria |
| Seed plant, Pteridophytes, | [Chl a + b] | [BChl a/b] |
| Bryophytes, Stonewort, Green | Prokaryotic green | Purple sulfur bacteria |
| algae, and | algae | Purple non-sulfur bacteria |
| Euglena | [Chl a + Phy] | [BChl a + c/d/e/g] |
| [Chl a + c] | Cyanobacteria | Green sulfur bacteria |
| Brown algae, Diatoms, Golden | | Green filamentous bacteria |
| algae, and Dinoflagellates | | Heliobacteria |
| [Chla + c + Phy] | | Archaebacteria |
| Cryptoalgae | | [Rho] |
| [Chl a + Phy] | | Halophilic bacteria |
| Red algae | | |

NOTE:
Abbreviations in parentheses [ ] in the table above means major photoreceptor dyes following:
Chl: Chlorophylls
BChl: Bacteriochlorophylls
Phy: phycopyrins
Pho: Rhodopsins As described above, the plant cultivation method (photosynthetic organism production method) according to the embodiment of the present invention is effective for photosynthesis of all kinds of plants such as leaf vegetables, flowers, fruit trees, seaweeds, algae, and microalgae. The plant cultivation method (photosynthetic organism production method) according to the embodiment of the present invention is also effective for root vegetables such as potato, carrot, burdock, and Japanese horseradish. Furthermore, the plant cultivation method (photosynthetic organism production method) according to the embodiment of the present invention is also effective for plant cultivation in a farm field, a greenhouse, a plant factory, a smart cell (smart cell industry, material production by living organisms), land aquaculture, a sea surface, undersea, a water surface, underwater, and a mountainous area. Then, the growth of phytoplankton such as Euglena described in Example 4 can also be promoted by additional light irradiation. In addition, the In the first step, only beneficial phytoplankton are shifted to a high-speed growth mode (high-speed growing mode) by additional light irradiation. In the second step, the phytoplankton are released into fresh water or sea water. By such an operation, it is possible to prioritize and grow phytoplankton having no poison among various kinds of phytoplankton, in fresh water or sea water.

In addition, by preventing the phytoplankton from unnecessarily growing, it is possible to prevent occurrence of red tide, whitening of corals, and the like. From these, it is possible to prevent marine resources from decreasing (being exhausted) and to increase marine resources. In addition, by spraying the grown phytoplankton on fresh water or sea water, it is possible to accelerate the growth of marine resources and promote the reproduction of marine resources. Furthermore, it is possible to conserve and improve the water environment by using a water purification function by marine resources such as seashells.

Incidentally, in a case where beneficial algae adhere to corals, corals and algae coexist, and a product (photosynthetic product) by photosynthesis of algae becomes nutrients of corals. That is, algae attached to a calcareous surface in corals perform photosynthesis, and the photosynthetic product is supplied to corals as nutrients. Therefore, when the corals are irradiated with the additional light, the growth of algae is promoted, and as a result, a state of the corals is kept good. Then, by selectively growing a beneficial kind of algae for corals and attaching the algae to corals, it is possible to protect corals.

In addition, the growth of photosynthetic organisms by additional light irradiation can also be applied to soil algae. The soil algae mainly include blue green algae, green algae, yellow green algae, diatoms, red algae, and the like. By irradiating the soil algae with additional light and spraying one or more selected kinds of soil algae onto the soil, it is possible to perform soil modification. Not only the soil algae but also the algae in the hydrosphere as described above can be grown by additional light irradiation and applied to the soil to perform soil modification.

<<Selective Growth of Microalgae>>

The Euglena and Chlorella which are microalgae store polysaccharides paramylon (β-1,3-glucan) and triacylglycerol in cells, respectively. Therefore, when the Euglena and the Chlorella are mixed in the culture pond, a process of separating and purifying the respective stored substances is newly required. In order to avoid this, a technique capable of selectively culturing only one of the microalgae is required. For this purpose, it is effective to culture the microalgae in two steps.

That is, in a first step, only one of the Euglena and Chlorella is shifted to the high-speed growth mode (high-speed growing mode). In a subsequent second step, the microalgae grown at a high speed are charged into the culture pond. As a result, the number of microalgae in the culture pond becomes larger in the microalgae that have shifted to the high-speed growing mode in the first step.

<Microalgae Growing Apparatus 30>

Figure 8:
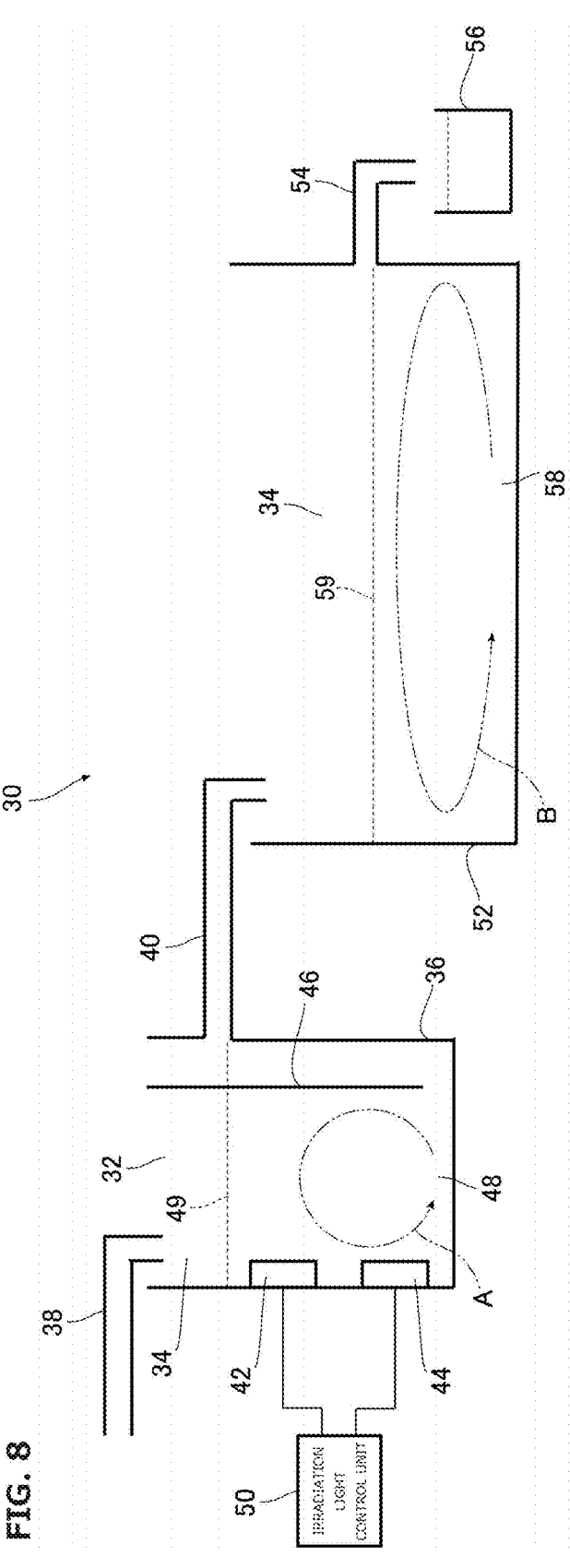
FIG. 8 is a schematic configuration view showing a microalgae growing apparatus used for two-step cultivation.

FIG. 8 shows a schematic configuration of a microalgae growing apparatus (microalgae production apparatus) 30 that can be used for stepwise growth of microalgae. The microalgae growing apparatus 30 is a plant cultivation apparatus for cultivation of microalgae, and constitutes a plant cultivation system (or a microalgae growth system). The microalgae growing apparatus 30 in the example of FIG. 8 is a preferential culture apparatus for Euglena. The microalgae growing apparatus 30 can culture Euglena preferentially.

The microalgae growing apparatus 30 includes a front chamber 32 for a first step and a culture pond 34 for a second step. The front chamber 32 is used to preferentially grow only specific microalgae. The front chamber 32 includes a culture vessel 36, a water introduction pipe 38, a water discharge pipe 40, a main light source 42, an additional light source 44, a partition wall 46, and the like. In FIG. 8, reference numeral 49 denotes a water surface of a culture solution 48 stored in the culture vessel 36.

As the main light source 42, a light source device capable of performing irradiation with main light is used in the culture solution 48, similarly to the main light source 20 in the plant cultivation apparatus 10 of the example of FIG. 5. As the additional light source 44, a light source device capable of performing irradiation with additional light is used in the culture solution 48, similarly to the additional light source 22 in the plant cultivation apparatus 10 of the example of FIG. 5. The main light source 42 and the additional light source 44 constitute a light irradiation unit.

The main light source 42 lights up continuously within a predetermined time, and continuously emits main light (also referred to as "continuous irradiation light"). As the main light source 42, for example, an artificial light source such as an LED, a fluorescent lamp, a plasma lamp, a mercury lamp, an incandescent lamp, a metal halide lamp, a sodium lamp, or an electrodeless lamp is used.

It is also possible to use sunlight as another main light. In a case where sunlight is used, it is possible not to use the main light source 42 or to omit the main light source 42. It is also possible to use both sunlight and light of the main light source 42. In this case, the sunlight and the light of the main light source 42 may be properly used according to conditions such as a time period. Furthermore, the sunlight and the light of the main light source 42 may be emitted (used) at the same time.

Although not illustrated, the additional light source 44 includes an additional signal light source and an additional moderate light source. The additional signal light source performs irradiations with the additional signal light, and the additional moderate light source performs irradiation with the additional moderate light.

The main light source 42 and the additional light source 44 are individually driven and controlled by a control (here, current control) of an irradiation light control unit 50. The additional signal light source and the additional moderate light source are also individually driven and controlled by the irradiation light control unit 50.

In the culture vessel 36, the culture solution 48 is undergoing convection as indicated by an arrow A. A device for convecting the culture solution 48 may be installed in the culture vessel 36.

In the culture vessel 36, most portion of the culture vessel 36 and a portion close to the water discharge pipe 40 are partitioned by the partition wall 46. The culture solution 48 mainly convects inside the partition wall 46.

The water surface 49 of the culture solution 48 reaches the water discharge pipe 40, and the culture solution 48 flows into the water discharge pipe 40. The culture solution 48 passes through the water discharge pipe 40 and flows out to the culture pond 34 for the second step.

The culture pond 34 for the second-step includes a cultivation container 52, a water pumping pipe 54, and the like. A water pumping bucket 56 is installed below a tip of the water pumping pipe 54. A reference numeral 59 indicates a water surface of the culture solution 58 stored in the cultivation container 52. The water surface 59 reaches a height of the water pumping pipe 54.

In the cultivation container 52, the culture solution 58 is undergoing convection, as indicated by an arrow B. A device for convecting the culture solution 58 may be installed in the cultivation container 52.

Although not illustrated, a light shielding member that shields additional light is installed between the front chamber 32 for the first step and the culture pond 34 for the second step. As the light shielding member, various curtains and the like can be adopted.

In such cultivation in a plurality of steps, cultivation can be efficiently performed by setting a water environment (for example, a salinity, a degree of nutrients, a temperature (water temperature), a convection speed, a degree of stirring, and the like) between the steps to be the same as possible.

In addition, as in a modification example of the plant cultivation apparatus 10 (FIG. 5) described above, irradiation with the light of the additional light source 44 is performed toward the inside of the culture solution 48 via an optical fiber. As the optical fiber, an optical fiber having end surface emission or side surface emission can be appropriately used. For example, a side-emitting optical fiber may be provided so as to circulate around an inner wall surface of the culture vessel 36, and irradiation with additional light may be performed from a side surface of the optical fiber toward the inside of the culture vessel 36. In addition, for example, a side-emitting optical fiber may be disposed at the center of the culture vessel 36, and irradiation with the additional light may be performed from the side surface of the optical fiber toward the inner wall of the culture vessel 36.

Example 7

Hereinafter, an example using the microalgae growing apparatus 30 will be described. In the present example, only the Euglena of microalgae was put into the culture vessel 36 (step (S)11 in FIG. 9), and irradiated with main light and additional light (S12). Furthermore, the irradiation with the additional light was stopped, and the Euglena was shifted to the high-speed growing mode (S13). Specifically, the irradiation with the additional signal light and the additional moderate light was terminated, and the Euglena was shifted to the high-speed growing mode.

Subsequently, the culture solution (water in this case) was continuously caused to flow into the culture vessel 36 for the first step at a constant flow rate via the water introduction pipe 38 (S14). An inflow amount of the culture solution was set to be enough to totally replace the culture solution in the culture vessel 36 about 7 days to 10 days.

Figure 9:
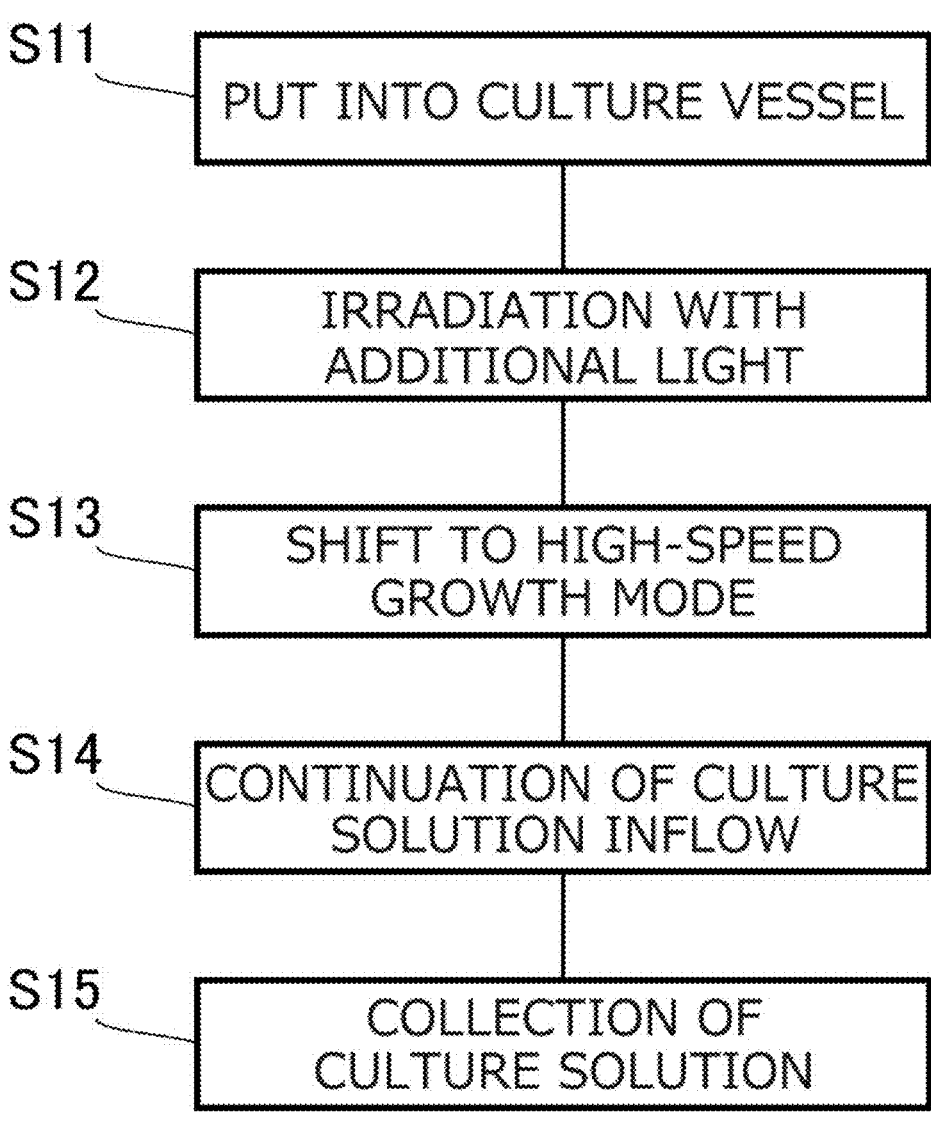
FIG. 9 is a flowchart showing a procedure of Euglena growth performed in two steps.

As described above, the culture solution at a constant flow rate was introduced into the culture vessel 36 from the water introduction pipe 38, and the culture solution at the same amount as the inflow amount was caused to flow into the culture pond 34 for the second step via the water discharge pipe 40. In this manner, the Euglena in the high-speed growing mode was continuously charged into the culture pond 34 for the second step. In the culture pond 34, the culture solution 58 was discharged at a constant flow rate via the water pumping pipe 54, and the culture solution 58 containing Euglena was collected in a water pumping bucket 56 (S15). In the example of FIG. 9, S11 to S13 belong to the first step, and S14 and S15 belong to the second step.

Here, cultivation only with main light was performed in the culture pond 34. A main light source may be provided in the culture pond 34.

At the start of cultivation, 20% or more of diatoms and Chlorella were mixed in addition to Euglena, in the culture pond 34 for the second step. In the present example, the Euglena in the high-speed growing mode became dominant in the culture pond 34 as the number of cultivation days (the number of growth days) elapsed. Furthermore, after 20 days from the start of cultivation, Euglena accounted for 95% or more of the microalgae.

As described above, the microalgae growing apparatus 30 of the present example was able to preferentially grow only specific microalgae Euglena. However, without being limited to the Euglena, for example, when Chlorella is input to the front chamber 32 for the first step, Chlorella occupies a large number of microalgae in the culture pond 34 for the second step. Also, in addition to the microalgae Euglena and Chlorella, it is also possible to preferentially grow only phytoplankton beneficial for fish and shellfish.

In the experiment by the inventors, in the two-step cultivation as described above, when the PPFD of the main light is limited to about the light compensation point only for the last short period (for example, 1 to 2 days) in the first step, the growth in the second step is remarkably accelerated. At the present step, the inventors have conducted experiments on lettuce and Euglena.

It is considered that such growth promotion is caused by the survival instinct of a plant, and DNA issues an instruction to increase a chlorophyll concentration when detecting that the light becomes dark or the irradiation time becomes short at the end of the first step.

More specifically, in cultivation in which main light irradiation is repeated at a constant PPFD value every day in a constant irradiation time period, when an irradiation condition of main light is rapidly changed, a plant takes countermeasures against environmental variations. For example, when the intensity of the main light is rapidly decreased, the DNA issues an instruction to increase the chlorophyll in order to compensate for the decrease in photosynthesis. In addition, similarly, in a case where the irradiation time is rapidly shortened, the DNA issues an instruction to increase an amount of the chlorophyll. By appropriately using such a defense reaction against an environmental change, a greater growth promoting effect can be obtained.

In the case of two-step cultivation, the growth promoting effect can be increased by rapidly lowering the PPFD value of the main light to, for example, an optical supplementary focusing point in an arbitrary time period of the first step (including the end of the first step). In addition, the growth promoting effect can be increased by shortening the irradiation time of the main light. Furthermore, even in the second step, a greater growth promoting effect can be obtained by rapidly changing the irradiation condition of the main light.

Regarding the increase in chlorophyll production, it is not currently clear whether: (1) as a result of an increase in the chlorophyll that the chloroplast itself has, the total amount of chlorophyll increases; (2) as a result of an increase in chloroplasts, the total amount of chlorophyll increases; or (3) both of these occur. However, it can be considered that the additional signal light has an effect of increasing the number and size of chloroplasts.

The present inventors expect that the additional light has a high effect of flowing the photosynthetic product into the primary metabolism and secondary metabolism pathways. The reason is as follows.

In general, when the light intensity is increased to a certain value or more, the photosynthesis amount is saturated. The reason why the photosynthesis amount is saturated is considered to be that a chemical reaction rate reaches the maximum value compared to before and the reaction cannot be increased any more. As for the saturation of the photosynthesis amount, the inventors currently expect that there is a mechanism in which photosynthetic products are sufficiently accumulated and the photosynthesis is braked.

If the irradiation with additional light has an effect of increasing the speed at which the photosynthetic product flows to the primary metabolic pathway and the secondary metabolic pathway, there is no problem that the photosynthesis amount exceeds a saturation value. That is, it is possible to strongly estimate that the irradiation with additional light has an effect of increasing the chlorophyll concentration to increase the photosynthesis rate and an effect of increasing a consumption rate of the photosynthetic product.

<Application to Photosynthetic Organisms Production in Wide Range>

Plants convert carbon dioxide, which is a cause of global warming, into oxygen by photosynthesis. Plants are located at the beginning of a food chain. Therefore, if the growth of plants can be promoted on a global scale, it can greatly contribute to recovery of the global environment and improvement of food self-sufficiency. In addition, de-carbon dioxide (reduction of carbon dioxide, decarbonization, carbon recycling, and the like) can be effectively advanced by promoting growth of photosynthetic organisms by irradiation with additional light.

According to the various photosynthetic organism production methods as described above, the growth promoting effect of the photosynthetic organism by the additional light irradiation can be obtained even when the PPFD value of the additional light is about 1/1 million of the sunlight on the surface of the earth. The PPFD of direct sunlight is about 2000 $(\mu mol \cdot m^{-2} \cdot s^{-1})$, and the PPFD on a cloudy day is about 50 to 100 $(\mu mol \cdot m^{-2} \cdot s^{-1})$.

Therefore, when a light emission intensity and a light divergence characteristic (also referred to as a "light diffusion characteristic") of the additional light are appropriately selected, even if the additional light source (including the additional signal light source and the additional moderate light source) is installed (mounted) on an object (moving object) moving in a place away from the photosynthetic organism such as a plant, the growth promoting effect of the photosynthetic organism can be obtained.

The above-described "moving object" includes various flying objects, ships, land vehicles, and the like. Examples of the flying object can include an aircraft (including a passenger plane transporting passengers), a helicopter, a drone, a spacecraft and a satellite orbiting the moon and the earth, and the like. Examples of the ship can include a surface ship and an underwater ship. Examples of the land vehicle include not only agricultural vehicles but also cattle vehicles, environmental maintenance vehicles, and leisure vehicles (including golf carts). By performing irradiation with additional light from these moving objects, the growth promoting effect of the photosynthetic organism can be obtained.

When an additional light source is installed in the moving object, growth of photosynthetic organisms distributed in a wide range can be promoted. Examples of the photosynthetic organism can include plants that inhabit mountain forests, mountainous ponds, and grassland areas, seaweeds such as eelgrass and water bloom in the sea and fresh water, and microalgae such as phytoplankton and Euglena. In addition, for example, in a case where a coral reef is irradiated with additional light using a flying object or a ship, it is possible to attach a large amount of algae to the coral. As a result, it is possible to grow corals using photosynthetic products of algae as nutrients, and it is possible to protect and recover coral reefs.

By appropriately selecting the wavelength of the additional light, a secondary metabolite contained in a plant can be controlled. As described above (including Example 1), a biomass increasing effect increases as the wavelength becomes shorter (the growth promoting effect increases), and the secondary metabolism promoting effect increases as the wavelength becomes longer. Therefore, by appropriately selecting the wavelength of the additional light, it is possible to respond to the desire of a cultivation area to greatly increase a harvest weight, a desire of a cultivation area to greatly increase a nutrient component, and the like.

In a case where the additional light source is installed in the moving object, it is effective to combine a device (light divergence angle adjustment device) capable of adjusting a light divergence angle with the additional light source. Examples of the light divergence angle adjustment device include a light convergence lens and a device having a parabolic antenna shaped mirror surface. By installing these light divergence angle adjustment devices and adjusting the light divergence angle, the irradiation range of the additional light can be limited.

In particular, in a case where an additional light source is installed at a remote place from the earth, such as a spacecraft or a moon surface, adjusting the light divergence angle is important. As a result, even in the case of additional light irradiation from a remote place, growth can be promoted in a limited target place. Examples of the installation place of the light divergence angle adjustment device include the vicinity of the additional light source, a land or building (optical relay point) between the additional light source and the cultivation area, and the vicinity of the cultivation area.

For example, a spacecraft orbiting at an altitude of several hundred kilometers from the surface of the earth is moving at a period of approximately one and a half hours. Irradiation with the additional light may be continuously performed from such a spacecraft. In addition, without limiting thereto, irradiation with the additional light may be performed only from above a specific place. Since a geostationary satellite is located above a certain surface of the earth, when irradiation with the additional light is performed from the geostationary satellite, an irradiation range of the additional light can be more precisely limited.

Figure 10:
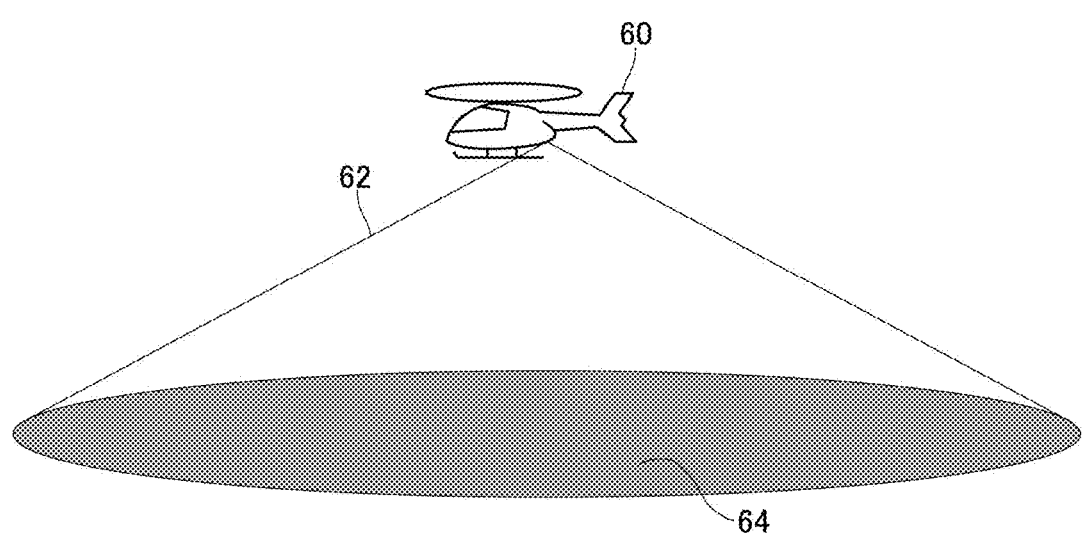
FIG. 10 is an explanatory view schematically illustrating a state in which a flying object performs irradiation with additional light.

FIG. 10 schematically illustrates an example of a state in which a helicopter 60 irradiates plants 64 with additional light (here, the additional signal light and the additional moderate light) 62 in a diverging manner. In FIG. 10, irradiation is performed with the additional light enlarged in a circle, but an irradiation method of the additional light is not limited thereto. For example, it is also possible to linearly scan (reciprocate scan) a spot of the additional light to perform irradiation in a wide range.

<Effect for Each Use of Plant>

The additional light has an effect of promoting photosynthesis and an effect of promoting migration of a product (photosynthetic product) by photosynthesis to a primary metabolic pathway (primary metabolic cycle, pathway for primary metabolism) and a secondary metabolic pathway (secondary metabolic cycle, a pathway for primary metabolism).

Plants are often used as foods, medicines, fragrance components, and the like. According to the various photosynthetic organism production method described so far, by performing irradiation with additional light in addition to main light such as sunlight, it is possible to increase the production of foods, specific medicinal ingredients, aroma ingredients, and the like.

For example, the taste of vegetables such as lettuces generally includes an acrid taste that children do not like. In the experiment of the inventors, it was possible to suppress the acrid taste of the lettuce to such an extent that the user does not feel the acrid taste, in a case where irradiation with the additional signal light having a wavelength of 500 nm to 600 nm or longer is performed. This is considered to be because a nitrogen component contained in a vegetable was changed to amino acid, glutamic acid, or the like. As a result, consumers who do not like vegetables can be reduced, and a consumption amount of the vegetable can be increased.

The same applies to a coriander. The coriander produced in Japan may be evaluated as having stronger stimulation in taste than those produced in Thailand. However, by irradiation with additional light, stimulation can be suppressed, and consumers and consumption can be expanded. As described above, the irradiation with additional light increases a sweet taste of grapes. In the experiments of the inventors, the sweet taste of grapes can be similarly and more remarkably increased by irradiation with the additional signal light having a wavelength of 500 nm to 600 nm or longer.

Based on these findings, it is considered that, for example, an aroma and a sweet taste of green tea can be increased by irradiation with additional light.

In a seedling irradiated with additional light in at least a part of a seedling growing period (a seedling grown in an additional light environment in the seedling growing period), an effect of promoting growth and metabolite production lasts longer, as compared with a seedling not irradiated with additional light thereafter. The same applies to a case where cultivation is performed only with main light such as sunlight or white LED light after the additional light irradiation, and a case where irradiation with the main light and the additional light are performed. For example, only by performing irradiation with additional light several days before a harvest period and completing the irradiation, it is possible to harvest, at a later date, vegetables with less acrid taste, fruits with strong sweet taste, and the like.

In addition, the additional light also has an effect of increasing a germination rate and a non-defective rate of a seed. When a plant is grown in the additional light environment during a period from germination to seedling growing, the effect of promoting growth and metabolite production lasts longer, as compared with a case where irradiation with the additional light is not performed thereafter. The same applies to a case where cultivation is performed only with main light after the additional light irradiation, and a case where irradiation with the main light and the additional light are performed.

The additional signal light can control a weight of seeds of rice, wheat, barley or the production of an umami ingredient such as glutamic acid, a medicinal ingredient such as β-glucan, and a pungent component or a flavor component of fragrant grass such as herbs or coriander.

Therefore, according to the various photosynthetic organism production method described so far, it is possible to cultivate seedlings such as lettuce, tomato, and rice plants, having a faster growth rate than conventional growth rate, fruits such as grapes and peaches, having a high sugar content, medicinal herbs having a large amount of medicinal ingredient, fragrant grass having a suppressed pungent taste, fragrant grass having a large amount of flavor ingredient, water pepper and red perilla containing a large amount of pigment ingredient, and the like, as annual herbaceous plant (annual plants).

In order to selectively increase the production of secondary metabolic components such as ascorbic acid (vitamin C), β-carotene (precursor of vitamin A), polyphenol, and s-allylcysteine contained in plants, phytochrome, which is a protein receptor, may be selectively excited.

There are two types of phytochromes, Pr type and Pfr type, depending on an aggregate form of proteins. The Pr type shifts to the Pfr type by photoexcitation. Conversely, the Pfr type shifts to the Pr type by photoexcitation.

The Pr-type phytochrome has an effect of particularly promoting the production of ascorbic acid among secondary metabolites. On the other hand, Pfr-type phytochrome has an effect of promoting the production of polyphenol or β-carotene which is secondary metabolite other than ascorbic acid, s-allylcysteine which is a medicinal ingredient of garlic, and the like. Utilizing these properties makes it possible to control the production of secondary metabolites while promoting growth.

Protein receptors contained in photosynthetic organisms such as plants include, in addition to the phytochrome, phototropin involved in movement of photochlorophyll, phototropism, and pore opening and closing, and cryptochrome involved in flowering time or light-avoidance reaction. By selectively exciting these protein receptors by additional signal light, it is possible to further precisely control the growth rate and secondary metabolite production.

Example 8

Hereinafter, examples relating to a germination rate in a case where seeds of plants are irradiated with the additional light will be described. In the present example, the inventors sowed the seeds of lettuce on a sponge containing water. The sponge was cut and seeds were placed (sowed) one by one in the cut. These sponges were held in a dark place for 2 days, and then cultivated on a seedling growing rack for 7 days.

In the cultivation shelves, seedling growing was performed using two kinds of samples: a control in which irradiation only with main light was performed; and a test section in which irradiation was performed with additional signal light and additional moderate light in addition to main light. The number of sponges in which seeds were placed (disposed) was 30 (60 in total) in each of the control and the test section. One seed was placed in one sponge.

A white LED was used as the main light. The LED for main light was turned on continuously for 14 hours from 8:00 out of 24 hours a day, and then turned off for 10 hours. A PPFD of the white LED was set to 130 ($\mu$mol·m$^{-2}$·s$^{-1}$).

The additional signal light had a wavelength of 350 nm to 420 nm, and a PPFD of 0.005 ($\mu$mol·m$^{-2}$·s$^{-1}$). The additional moderate light had a wavelength of 350 nm to 420 nm, and a PPFD of 0.01 ($\mu$mol·m$^{-2}$·s$^{-1}$).

Parameters of the additional signal light were set as follows: T=30 $\mu$s, $\Delta T_1$=2 $\mu$s, $\Delta T_2$=3 $\mu$s, and $\Delta T_3$=25 $\mu$s. Both irradiations with the additional signal light and the additional moderate light were performed for 10 hours from 14:00, out of 24 hours a day.

Figure 11A:
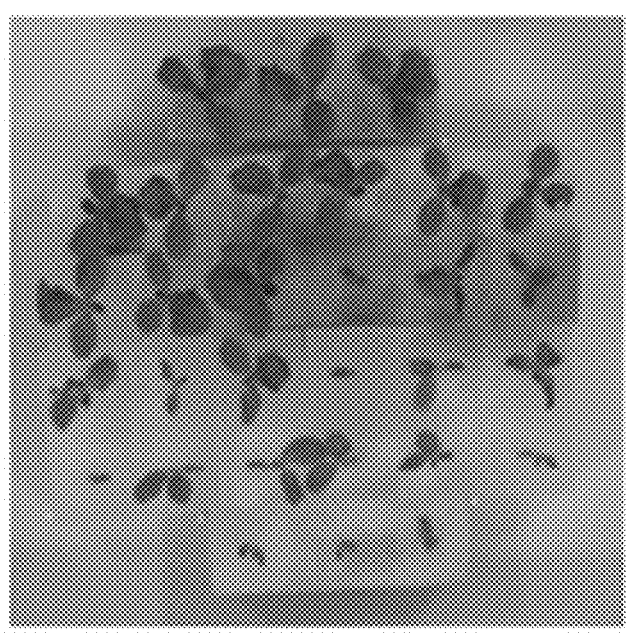
FIG. 11A is an explanatory view illustrating a control of Example 8 by an image.
Figure 11B:
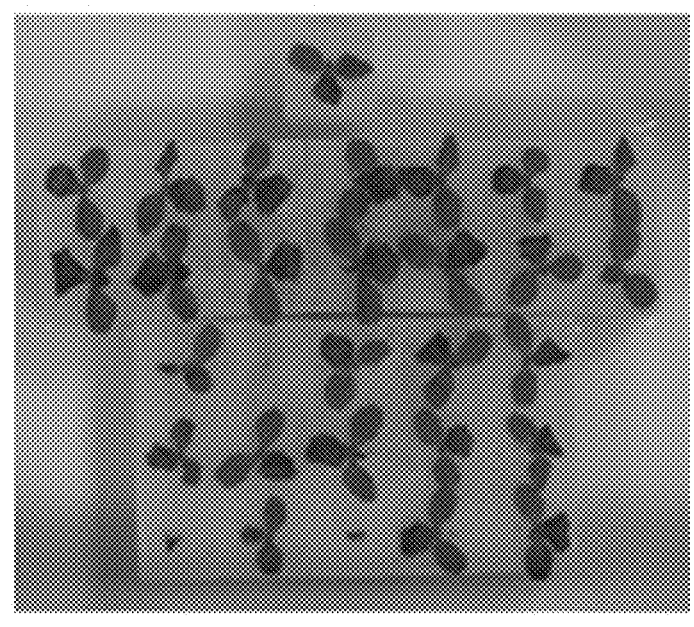
FIG. 11B is an explanatory view illustrating a test section of Example 8 using an image.

FIG. 11A illustrates an image of a photograph of a germination state of the control, and FIG. 11B shows an image of a comparative photograph of a germination state of a test section. As compared with the control (FIG. 11A), the leaves of the lettuce in the test section (FIG. 11B) are grown larger overall (on average).

The number of germination was 21 in 30 in the control (FIG. 11A) and 27 in 30 in the test section (FIG. 11B). The non-defective rate (a rate of seeds germinated in a good state) was 70% in the control and 90% in the test section.

As a determination criterion for germination, when three leaflets of the lettuce appeared, it was determined that the lettuce germinated well. The reason for this is that it is known that the lettuce having two or fewer leaflets at 9 days after sowing does not grow smoothly.

According to the present example, the additional signal light having a wavelength of 350 nm to 420 nm has an effect of promoting germination of the lettuce. Then, for example, by selling pre-germinated seeds irradiated with main light and together with additional signal light and additional moderate light to a consumer, it is possible to supply seeds that germinate large on average to a seedling market.

<Growth Acceleration and Deceleration>

Heretofore, it has been described that the irradiation with additional light is used for growth and promotion of metabolism. However, for example, the additional signal light having a red wavelength decreases a growth rate and promotes the production of secondary metabolites. That is, the specific additional signal light has an effect of suppressing the growth of a photosynthetic organism.

In recent years, in large-scale farms of lettuce and the like, equalization of harvest times is required. This is because it is difficult to secure workers (secure labor) when the harvest time is concentrated.

In addition, in a place close to a street lamp, so-called "light damage" in which growth of weeds, rice plants, and the like is accelerated occurs.

Furthermore, a pyrethrum which is a short-day plant starts to flower when the day length becomes short. In order to delay such flowering, the pyrethrum is irradiated with yellow or red light during night time. Such cultivation that performs light irradiation is called "lighting" or "lighting cultivation".

By increasing the wavelength of the additional light, more photosynthetic products can flow through the secondary metabolic cycle than the primary metabolic cycle. When such a property is used, growth can be decelerated (growth deceleration).

For example, it is possible to consider a photosynthetic organism production method or a plant cultivation method in which irradiation with an additional signal light (additional signal light for growth acceleration) for growth promotion is performed at an early step of growth, and irradiation with additional signal light (additional signal light for growth deceleration) for promoting secondary metabolism is performed at a time when harvest is approaching (final step of growth).

By adopting such a method, the secondary metabolic components can be increased without changing the harvest weight. Furthermore, the sugar mass can be reduced. A method of performing growth deceleration (growth deceleration method) is particularly effective for leaf vegetables such as lettuce, Japanese mustard spinach, and spinach, and vegetables such as cabbage, Japanese ginger, and onion. Vegetables including leaf vegetables also contain carbohydrates. When accelerating conversion of carbohydrates to secondary components in vegetables, the weight of the vegetable is reduced.

Such a photosynthetic organism production method and a plant cultivation method are one type of a method of producing a photosynthetic organism in a plurality of steps and a method of cultivating a plant in a plurality of steps. In this case, it is possible to perform growth acceleration in a first step and to perform growth deceleration in a second step.

By adopting these methods, it is possible to prepare an apparatus for growth acceleration (photosynthetic organism producing apparatus and plant cultivation apparatus).

In the experiment of the inventors, an effect of changing the number of cultivation days (changing effect for the number of cultivation days) in a case of combining the growth acceleration and the growth deceleration was about +20%. For this reason, for example, in a case where the photosynthetic organism is usually harvested in four weeks, it is possible to harvest in three weeks by acceleration of growth, and it is possible to harvest in five weeks by deceleration of growth. Furthermore, it is also possible to harvest a photosynthetic organism in, for example, four weeks by combining acceleration of growth and deceleration of growth.

<Growth Promotion of *Cannabis* Plant>

Irradiation with the additional light is also effective for a *cannabis* plant (annual herb of Cannabaceae *Cannabis*).

Leaves and spikes of the *cannabis* plant contain secondary metabolic components such as tetrahydrocannabinol having a pharmacological action. Irradiation with additional light can increase the content of tetrahydrocannabinol in the *cannabis* plant. Also regarding the leaves of the *cannabis* plant, when considered in the same manner as the red perilla in Example 5 described above, both the leaf weight and a content rate of the secondary metabolic component can be increased. It is assumed that approximately 2 times as much tetrahydrocannabinol can be purified compared to a control ratio. The content of the tetrahydrocannabinol is calculated as follows: leaf weight (1.6 times)×content rate (1.2 times).

<Improvement in Usability>

Regarding an apparatus that performs irradiation with the additional light as in the plant cultivation apparatus 10 illustrated in FIG. 5 and the microalgae growing apparatus 30 illustrated in FIG. 8, from a viewpoint of user friendliness, it is desirable to take measures to improve operability and ease of use.

For example, an operator (user) operating the apparatus inputs information (name information or the like) on a photosynthetic organism such as a plant to be grown by operating a predetermined input unit. Examples of the input unit can include a mobile terminal such as a smartphone or a tablet terminal. In addition, examples of the input unit can include a dedicated operation panel and a laptop (notebook personal computer).

An input result to the input unit is input to, for example, the irradiation light control unit 16 of the plant cultivation apparatus 10 illustrated in FIG. 5. The irradiation light control unit 16 searches for identification information (ID information) of the input photosynthetic organism, and refers to information of the irradiation condition (irradiation condition information) associated with the identification information. The irradiation light control unit 16 outputs a signal for driving the additional signal light source 24 based on the irradiation condition information referred to. The irradiation light control unit 16 also outputs a signal for driving the additional moderate light source 26 as necessary.

In addition, as another embodiment, the input unit may be an imaging device such as a camera, and a photosynthetic organism (plant or the like) can be imaged by the camera. In this case, the irradiation light control unit 16 determines a kind of the captured photosynthetic organism from the image information acquired by the camera. Determination of the kind of the photosynthetic organism can be performed by artificial intelligence that has obtained information of a determination criterion in advance by machine learning or the like.

The irradiation light control unit 16 refers to the irradiation condition information associated with the identification information of the photosynthetic organism. The irradiation light control unit 16 outputs a signal for driving the additional signal light source 24 or the additional moderate light source 26 based on the irradiation condition information referred to.

Such an identification of the photosynthetic organism and the additional light irradiation in accordance with the identified photosynthetic organism can also be applied to the microalgae growing apparatus 30 illustrated in FIG. 8. In addition, these can also be applied to a photosynthetic organism producing apparatus of a type different from the plant cultivation apparatus 10 illustrated in FIG. 5 or the microalgae growing apparatus 30 illustrated in FIG. 8.

<Solving Social Problem by Promoting Growth of Photosynthetic Organisms>

The photosynthetic organism production method according to an embodiment of the invention of the present application promotes growth of a photosynthetic organism, and makes it possible to solve various social problems. For example, since a period required for plant cultivation can be shortened, the number of man-hours required for plant cultivation can be reduced. Furthermore, for example, a burden on a worker engaged in cultivation can be reduced. In addition, the heating costs of a greenhouse (agricultural greenhouse) can be reduced.

Since the burden on the worker can be reduced, it is possible to appropriately redistribute the labor force. This can contribute to the elimination of a shortage of working population or a labor shortage.

Furthermore, for example, as compared with a cultivation method in a plant factory in which a plant is constantly irradiated with artificial light, the time for light irradiation can be shortened, and the amount of energy required for growth promotion can be reduced. That is, as described above, the photosynthesis promoting effect continues not only when irradiation with the additional signal light is performed but also after the irradiation is completed. Therefore, it is not necessary to constantly perform the irradiation with additional light, and there is little time restriction. Then, if irradiation with additional light is performed in a limited short period of time, growth can be promoted. Therefore, the amount of energy consumption for growth promotion can be reduced.

Furthermore, effects can be expected for reduction in utility costs of artificial light-type plant factories, improvement in productivity of solar sharing agriculture, and the like.

Since the harvest amount of vegetables and fruits increases, it is possible to obtain a large harvest from small seeds and seedlings. As a result, it is possible to improve a food self-sufficiency rate in each country in which the invention of the present application is implemented, which contributes to solving food shortage and food crisis.

In the experiments of the inventors (including the experiments according to the respective Examples), an increase in the harvest amount of at least about 20% can be expected. In a case where additional light irradiation is performed on a plant that becomes food, it is possible to increase food by about 20%. In addition, there is also an experimental result that components of the secondary metabolites increase by about 1.5 to 2 times overnight. Therefore, it is possible to rapidly increase food.

Furthermore, growing of plant cultivation can be efficiently performed, and plants can be grown even in countries and lands where a condition related to plant cultivation is not good. For this reason, the demand for plant transportation to areas and countries far from the cultivation area decreases. As a result, food miles are reduced, and the transportation costs or the distribution costs of the plant can be reduced. Since the transportation costs and the distribution costs include the energy costs of a transportation facility (an aircraft, a ship, a vehicle, and the like), the energy costs of the transportation facility can also be reduced.

In addition, local production of plants for local consumption can be promoted, and this can also reduce the transportation costs and the distribution costs.

It is possible to more reliably promote the growth of plants in a wide range even in a case of desert greening.

When promoting growth, a large amount of carbohydrate is consumed. Therefore, low-carbohydrate plants can be cultivated. Then, low-carbohydrate vegetables and the like are provided to the consumer, and the consumer can maintain good health.

From these, it is possible to solve many social problems such as reduction in greenhouse gas emissions, securing of consumption resources, suppression of deforestation, sustainable development of agriculture, realization of a green society, and achievement of SDGs (sustainable development targets).

Furthermore, in recent years, various measures such as a carbon tax, an emission amount trading, a credit trading, and a carbon border adjustment measure have been studied in each country and international society in order to realize carbon neutral. The growth of photosynthetic organisms by irradiation with additional light can activate studies on these measures.

For example, the Euglena described in Example 4 and the like described above absorbs about 10 times as much carbon dioxide as a forest in the same area. In addition, Euglena contains paramylon, and paramylon is also used for purifying jet fuel. Furthermore, by the irradiation with the additional light, plants such as lettuce becomes able to absorb twice as much carbon dioxide as before. Therefore, the growth of the photosynthetic organism by the irradiation with the additional light can greatly contribute to carbon neutral and realization of various measures.

Furthermore, growth of photosynthetic organisms by irradiation with additional light makes it possible to provide a carbon dioxide absorbing apparatus. The carbon dioxide absorbing apparatus includes at least a photosynthetic organism and an additional light irradiation device. A carbon dioxide absorbing apparatus that performs irradiation with additional light increases absorption of carbon dioxide by a photosynthetic organism.

Also in the carbon dioxide absorbing apparatus that performs irradiation with additional light, the photosynthetic organism performs photosynthesis by main light such as sunlight. The additional light irradiation device includes an additional signal light irradiation unit and an additional moderate light irradiation unit, and irradiates the photosynthetic organism with additional signal light or additional moderate light in accordance with a situation. Photosynthesis of the photosynthetic organism by main light is promoted by irradiation with additional light. The carbon dioxide absorbing apparatus can include a main light irradiation device that performs irradiation with artificial main light, in addition to the additional light irradiation device.

Such a carbon dioxide absorbing apparatus also functions as a carbon neutral propulsion device that promotes realization of carbon neutral.

<Inventions Extractable from Embodiments and Examples>

(1) A plant cultivation method including:

performing irradiation with main light (sunlight, artificial light, or the like) for photosynthesis and irradiation with additional light with which irradiation can be performed by being added to the main light, in at least a part of a cultivation period from sowing to harvesting, in which the additional light includes at least additional signal light among the additional signal light of which a light intensity periodically fluctuates and additional moderate light of which a light intensity gently changes as compared with the additional signal light.

(2) The plant cultivation method according to (1), in which the light intensity of the additional light is smaller than a light compensation point.

(3) The plant cultivation method according to (1) or (2), in which the light intensity of the additional light is determined depending on a plant which is a cultivation target.

(4) The plant cultivation method according to (3), in which a fluctuation period (8 μs or more and 200 μs or less or the like) of the light intensity related to the additional signal light is determined depending on a kind of a plant which is a cultivation target.

(5) The plant cultivation method according to (4), in which the fluctuation period of the light intensity related to the additional signal light is 8 μs or more and 200 μs or less.

(6) The plant cultivation method according to (5), in which the fluctuation period of the light intensity related to the additional signal light is 8 μs or more and 100 μs or less.

(7) The plant cultivation method according to (5) or (6), in which the fluctuation period of the light intensity of the additional moderate light is 1 ms or more.

(8) The plant cultivation method according to any one of (1) to (7), in which a period (period after planting, part of a day, 10 days from sowing to planting, seedling growing period, and the like) during which the irradiation of the additional light is performed is a period which is a part of the cultivation period from sowing to harvesting.

(9) The plant cultivation method according to (8), in which the period during which the irradiation of the additional light is performed is a seedling growing period.

(10) A plant cultivation apparatus (plant cultivation apparatus 10 or the like) which performs irradiation with main light (sunlight, artificial light, or the like) for photosynthesis of a plant, the plant cultivation apparatus including:

an additional light source (additional light source 22 or the like) that performs irradiation with additional light in addition to the main light; and an irradiation light control unit (irradiation light control unit 16 or the like) capable of driving and controlling the additional light source, in which the additional light source includes at least an additional signal light source among the additional signal light source (additional signal light source 24 or the like) that performs irradiation with additional signal light of which a light intensity periodically fluctuates and an additional moderate light source (additional moderate light source 26 or the like) that performs irradiation with additional moderate light of which a light intensity gently changes as compared with the additional signal light.

(11) The plant cultivation apparatus according to (10), including:

a main light source (main light source 20 or the like) that performs irradiation with the main light.

(12) The plant cultivation method according to (1), including:

a first step of performing cultivation with the additional light; and a second step of performing cultivation while stopping the irradiation with the additional light.

(13) The plant cultivation method according to (12), in which the second step is performed by moving a plant from a place where the first step is performed to another place.

(14) The plant cultivation method according to (12) or (13), in which an object to be cultivated is selected from the group consisting of a seedling, a phytoplankton, and microalgae.

(15) The plant cultivation apparatus according to (10), which performs:

cultivation of a first step in which cultivation using the additional light is performed; and cultivation of a second step in which cultivation is performed while stopping the irradiation with the additional light.

(16) The plant cultivation apparatus according to (15), in which the second step is performed by moving a plant from a place where the first step is performed to another place.

(17) The plant cultivation method according to any one of (1) to (9), in which a moving object (an aircraft, a helicopter, a drone, a spacecraft and a satellite orbiting the moon and the earth, a ship, a land vehicle, or the like) irradiates an area of a cultivation target (an area where a cultivation target plant exists) with the additional light.

(18) A photosynthetic organism (a seed of a plant, a seedling, a leafy vegetable, a root vegetable, a flower, a fruit tree, a seaweed, algae, microalgae, or the like) production method including:

performing irradiation with main light (sunlight, artificial light, or the like) for photosynthesis and irradiation with additional light for promoting the photosynthesis of a photosynthetic organism by the main light, in at least a part of a cultivation period from sowing to harvesting, in which the additional light includes additional signal light of which a light intensity periodically fluctuates and additional moderate light of which a light intensity gently changes as compared with the additional signal light.

Note that the photosynthetic organism to which the present production method can be applied can be subdivided as follows from the viewpoint of crops. That is, the present production method contributes to increasing a production amount and a production rate of these agricultural products.

(18-1) Rice: rice cultivated on the assumption of being used for food, rice for feed, rice for processing, rice not suitable for food, and bioethanol raw material rice (18-2) Wheat and miscellaneous grains: wheat, barley (six-row barley, two-row barley, naked barley), corn (dried), grain sorghum, sorghum (Indian millet, Sorghum bicolor, millet, kaoliang wheat), and other wheat and miscellaneous grains {buckwheat, proso millet, Japanese millet, german millet, oat (oats), and rye}

(18-3) Beans (dried): soybean, red bean, peanut (with shell), other beans {Kidney bean (dried), pea (dried)}

(18-4) Leaf and stem vegetables: asparagus, cabbage, broccoli, lettuce (salad greens, non-conical lettuce, red-leaf lettuce, celtuce), spinach, Chinese cabbage, sprouts (bean sprouts), Japanese mustard spinach, perilla, shungiku, pot-herb mustard (mizuna), bok choy, bamboo shoot, green onion, Chinese chive, onion, garlic, and other leaf and stem vegetables {shallots, cauliflower, myoga, mitsuba, celery, non-heading greens for pickling, rapeseed, parsley, butter-bur, Japanese parsley, radish sprouts, Udo, cod buds, scallions, Alpine leek, chive, edible chrysanthemum, Japanese horseradish, Brussels sprouts, other vegetables whose leaves or stems are edible (including those of which flowers, buds, and bulbs are edible)}

(18-5) Fruit vegetables: melon, watermelon, strawberry, bell pepper (color bell pepper), cucumber, eggplant, tomato (cherry tomato), sweet corn (fruit or vegetable), pumpkin, edamame (not dried), green bean (not dried), garden pea (not dried), snap pea, and other fruit vegetables {okra, paprika, sweet green pepper, balsam pear, white gourd, oriental pickling melon, chili pepper (undried), yugao gourd, broad bean, and green pea}

(18-6) Root vegetables: carrot, turnip, radish, ginger, burdock, lotus root, Yamano-imo (yama-imo, Japanese yam, Naga-imo, Yamato-imo, Icho-imo, Tsukune Imo), taro (shrimp potato), other root vegetables (except for bulbous vegetable), lily bulb, Japanese radish, and root vegetables not classified otherwise (mainly those whose roots and tubers are edible)

(18-7) Tuber vegetables: *Solanum tuberosum* (potato), *Ipomoea batatas* (sweet potato)

(18-8) Fruits: avocado, banana (not ripened), pineapple, mandarine orange (Satsuma mandarin), orange (navel orange), lemon lime, grapefruit, other citrus fruits {shiranui (dekopon), Buntan, iyokan, Watson pomelo, yuzu, hassaku, ponkan, Kiyomi, hyuganatsu, Sudachi, kumquat, tankan, kabosu, seminole, grape, apple (small apple and crab apple), sweet cherry (cherry), peach (nectarine), pear (Japanese pear, European pear, and Chinese pear), persimmon, Japanese apricot, kiwi fruit, chestnut, other fruits (plum, mango, fig, loquat, ginkgo nut, akebia, fruit of sansho, pepper, or vanilla, nuts or walnuts (with shell), blueberry, and olive)

(18-9) Flowers: chrysanthemum (cut flowers), lily (cut flowers), rose (cut flowers), lisianthus (cut flowers), carnation (cut flowers), cut branches {cut branches (including flowers, fruits, and foliage) of acacia, Japanese apricot, cherry tree, bamboo, camellia, Japanese quince, Japanese anise, sakaki, and the like}, other cut flowers (statice, gerbera, gypsophila, alstroemeria, *Gentiana scabra*, western orchid, stock, delphinium, sweet pea, tulip, gladiolus, and cut leaf), western orchid, flowering trees {bonsai, acacia, hydrangea, apanese apricot, Japanese plum, maple, kyachikuto, conifers, shrubby bamboo, azalea, rose, forsythia, and the like (among woody plants, those having cold resistance and those having non-cold resistance for appreciation of flowers and fruits)}, foliage plants {asparagus, ananas, ferns, Cissus, ficus, palms, yucca, and the like (herbaceous plants and non-cold-tolerant woody plants)}, other potted plants (cyclamen, cacti, suck plant, begonia), flowering trees and plants (plants and flowering trees (including saplings), garden tree saplings, street tree saplings, garden trees and street trees), and other flowers {bulbs, turf, ground covering plants (vines, bamboo and bamboo grass, dwarf mondo grass, herbaceous plants, and woody plants), and seedling for flowerbed}

(18-10) Craft crops: rapeseed, sesame, coffee beans (unroasted), tea (fresh leaves), cacao beans, sugar beet, sugar cane, leaf tobacco, konjac potato, cotton (seed cotton, ginned cotton, raw stock, raw cotton), other craft crops {hop (fresh/dried), rush, fiber raw material agricultural products (hemp, jute, and the like), paper-making raw material agricultural products (Kozo, mitsumata, and the like), seed for oil extraction (sunflower seeds, camellia seeds, cotton seeds, and the like), pharmaceutical raw material crops (panax ginseng, licorice, Coptis, and the like), essential oil/perfume raw material crops (peppermint and the like), dye raw material crops (indigo plant, safflower, and the like), persimmon leaves and other tea raw material crops (excluding those classified otherwise, such as wheat or buckwheat), and natural rubber (latex and the like)

(18-11) Other agricultural products: crops for grass and silage {grass (fresh/dry), WCS rice, silage crops (Green corn, sorghum, and the like), and mulberry}

(19) A seedling grown by the photosynthetic organism production method according to (18).

(20) A seed irradiated with the additional light by the photosynthetic organism production method according to (18).

(21) A phytoplankton grown by the photosynthetic organism production method according to (18).

(22) Microalgae grown by the photosynthetic organism production method according to (18).

(23) A carbon dioxide absorbing apparatus which performs the photosynthetic organism production method according to (18).

INDUSTRIAL APPLICABILITY

The plant cultivation method and the photosynthetic organism production method of the present invention are effective for open-field cultivation, greenhouse cultivation, and plant factory cultivation. Since these methods have a growth promoting effect on all plants performing photosynthesis, it can be used for improvement in production efficiency and reduction in production costs of leaves such as lettuce, perilla, and basil, fruit trees such as strawberry, grains such as rice and wheat, seaweeds such as wakame, green algae such as scoop and Euglena, and the like.

REFERENCE SIGNS LIST

10 Plant cultivation apparatus
12 Cultivation bed
14 Light irradiation unit
16 Irradiation light control unit
18 Protective member
20 Main light source
22 Additional light source
24 Additional signal light source
26 Additional moderate light source
30 Microalgae growing apparatus
42 Main light source
44 Additional light source
50 Irradiation light control unit

The invention claimed is:

1. A plant cultivation method comprising:
performing irradiation with main light for photosynthesis and irradiation with additional light for promoting the photosynthesis of photosynthetic organism by the main light, in at least a part of a cultivation period from sowing to harvesting, wherein
a light intensity of the main light is consistent, smaller than a photosynthesis saturated light intensity of the photosynthetic organism, and larger than a light intensity of the additional light,
the additional light includes
additional signal light of which a light intensity periodically fluctuates in a predetermined signal fluctuation period (T) such that a pulse of the light intensity in the signal fluctuation period is in a trapezoidal shape, and the pulse is composed with a rising period (ΔT1) during with the light intensity increases, a peak period (ΔT2) during which the light intensity is maintained with a maximum value, and a declining time (ΔT3) during which the light intensity decreases, and additional wave light of which a light intensity periodically changes in a predetermined wave fluctuation period (TM) such that the light intensity of the additional wave light continues to gradually changes to form a wave shape, and a gradient of the light intensity of the additional wave light is smaller than a gradient of the light intensity either at the rising period ($\Delta T1$) or at the declining period ($\Delta T3$) of the additional signal light.

2. The plant cultivation method according to claim 1, wherein the gradient of the light intensity of the additional wave light is smaller than the gradients of the light intensity at both the rising period ($\Delta T_1$) and at the declining period ($\Delta T_3$) of the additional signal light.

3. The plant cultivation method according to claim 1, wherein a light intensity of the main light is 1000 times or more than a light intensity of the additional light.

4. The plant cultivation method according to claim 1, wherein the light intensity of the additional light is smaller than a light compensation point wherein the light compensation point is defined as the light intensity at which a carbon dioxide absorption rate in photosynthesis of the photosynthetic organism is equal to or more than a carbon dioxide release rate in respiration of the photosynthetic organism.

5. The plant cultivation method according to claim 1, wherein the light intensity of the additional signal light and the light intensity of the additional wave light are both measured by a photosynthesis effective photon flux density (or PPFD) which is defined as an amount of light radiation with which a leaf surface of the photosynthetic organism is irradiated per unit area per second, and the PPFD of the additional moderate light is equal to or more than the PPFD of the additional signal light.

6. The plant cultivation method according to claim 5, wherein the PPFD of the additional signal light is ranged from 0.001 to 0.01.

7. The plant cultivation method according to claim 6, wherein the PPFD of the additional moderate light is ranged from 0.002 to 0.05.

8. The plant cultivation method according to claim 1, wherein the light intensity of the additional light is determined depending on the photosynthetic organism.

9. The plant cultivation method according to claim 8, wherein the photosynthetic organism is classified as one of types following: a seedling, a plankton, and algae, and fluctuation period of the light intensity related to the additional signal light is determined depending on the type of the photosynthetic organism.

10. The plant cultivation method according to claim 9, wherein the signal fluctuation period (T) of the light intensity related to the additional signal light is 8 µs or more and 200 µs or less.

11. The plant cultivation method according to claim 10, wherein the signal fluctuation period (T) of the light intensity related to the additional signal light is 100 µs or less.

12. The plant cultivation method according to claim 10, wherein the wave fluctuation period (TM) of the light intensity related to the additional wave light is 1 ms or more, and the signal fluctuation period (T) of the light intensity related to the additional signal light is shorter than the wave fluctuation period (TM) of the light intensity related to the additional wave light.

13. The plant cultivation method according to claim 9, the wave fluctuation period (TM) of the additional moderate wave light is 125 to 2 times longer than the signal fluctuation period (TS) (T) of the additional signal light.

14. The plant cultivation method according to claim 9, wherein a ratio of the rising period ($\Delta T_1$) with respect to the signal fluctuation period (T) of the light intensity related to the additional signal light is ranged from $\frac{1}{40}$ to $\frac{5}{8}$, wherein the rising period ($\Delta T_1$) is determined from a lowest point to a peak point of the light intensity.

15. The plant cultivation method according to claim 1, wherein a rising period ($\Delta TM$) of the light intensity related to the additional wave light is longer than 10 µs, and is more than four times as longer as the rising period ($\Delta T1$) of the additional signal light, wherein the rising period ($\Delta TM$) of the additional wave light is determined from a lowest point to a peak point of the light intensity in their fluctuations.

16. The plant cultivation method according to claim 1, wherein the cultivation period is divided into two periods that are a seedling growing period, which is defined from sowing to planting, and a growth period, which is defined from planting to harvesting, a portion of the cultivation period during which the irradiation of the additional light is performed is longer than half the seedling growing period.

17. The plant cultivation method according to claim 1, wherein the cultivation period is divided into two periods that are a seedling growing period, which is defined from sowing to planting, and a growth period, which is defined from planting to harvesting, a portion of the cultivation period during which the irradiation of the additional light is performed is longer than half the growth period.

18. A plant cultivation apparatus which performs irradiation with main light for photosynthesis of a target plant, which is a cultivation target, wherein a light intensity of the main light is consistent, and smaller than a photosynthesis saturated light intensity of the photosynthetic organism, the plant cultivation apparatus comprising:

an additional light source that performs irradiation with additional light which promotes the photosynthesis of the target plant by the main light, wherein the light intensity of the main light is larger than a light intensity of the additional light; and an irradiation light control unit capable of driving and controlling the additional light source, wherein the additional light source includes an additional signal light source that performs irradiation with additional signal light of which a light intensity periodically fluctuates in a predetermined signal fluctuation period (T) such that a pulse of the light intensity in the signal fluctuation period is in a trapezoidal shape, and the pulse is composed with a rising period (ΔT1) during with the light intensity increases, a peak period (ΔT2) during which the light intensity is maintained with a maximum value, and a declining time (ΔT3) during which the light intensity decreases, and an additional wave light source that performs irradiation with additional wave light of which a light intensity periodically changes in a predetermined wave fluctuation period (TM) such that the light intensity of the additional wave light continues to gradually changes to form a wave shape, the plant cultivation apparatus performs irradiation with the additional wave light together with the additional signal light, and a gradient of the light intensity of the additional wave light is smaller than a gradient of the light intensity either at the rising period (ΔT1) or at the declining period (ΔT3) of the additional signal light.

\* \* \* \* \*